(12) United States Patent
Shimura

(10) Patent No.: US 9,432,075 B2
(45) Date of Patent: Aug. 30, 2016

(54) COMMUNICATION APPARATUS AND PHASE ADJUSTMENT METHOD

(71) Applicant: FUJITSU LIMITED, Kawasaki-shi, Kanagawa (JP)

(72) Inventor: Toshihiro Shimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/728,604

(22) Filed: Jun. 2, 2015

(65) Prior Publication Data

US 2015/0365126 A1 Dec. 17, 2015

(30) Foreign Application Priority Data

Jun. 17, 2014 (JP) ................. 2014-124801

(51) Int. Cl.
| | |
|---|---|
| H04B 1/38 | (2015.01) |
| H04B 1/40 | (2015.01) |
| H04L 27/34 | (2006.01) |
| H04B 17/11 | (2015.01) |
| H04B 17/21 | (2015.01) |

(52) U.S. Cl.
CPC ............... *H04B 1/40* (2013.01); *H04B 17/11* (2015.01); *H04L 27/34* (2013.01); *H04B 17/21* (2015.01)

(58) Field of Classification Search
CPC ............ H04B 1/02; H04B 1/06; H04B 1/38
USPC .................. 375/219, 222, 221, 220, 296
See application file for complete search history.

(56) References Cited

U.S. PATENT DOCUMENTS

| | | | | |
|---|---|---|---|---|
| 4,426,735 | A | * | 1/1984 | Kasperkovitz ................ 455/222 |
| 5,442,653 | A | * | 8/1995 | Saito ............................ 375/219 |
| 2010/0093282 | A1 | * | 4/2010 | Martikkala et al. ......... 455/63.4 |
| 2010/0117693 | A1 | * | 5/2010 | Lorg et al. .................... 327/156 |
| 2012/0087617 | A1 | | 4/2012 | Morishita |
| 2014/0192923 | A1 | | 7/2014 | Matsuo et al. |

FOREIGN PATENT DOCUMENTS

| | | |
|---|---|---|
| JP | 2012-083499 | 4/2012 |
| JP | 2013-034129 | 2/2013 |

* cited by examiner

*Primary Examiner* — Helene Tayong
(74) *Attorney, Agent, or Firm* — Fujitsu Patent Center

(57) ABSTRACT

A communication apparatus includes: a switching device which modulates at least one of a first signal with a first frequency and passed through a first communication device and a second signal not passed through the first communication device at a second frequency lower than the first frequency; a signal combiner which combines together the first and second signals, at least one of which is modulated, to generate a composite signal containing a switching frequency component with an amplitude in response to the phase difference between the first and second signals at the second frequency; and a control unit which, based on the switching frequency component, obtains as a reference phase adjustment amount a phase adjustment amount applied by a phase adjuster in the first communication device.

15 Claims, 13 Drawing Sheets

COMMUNICATION APPARATUS AND PHASE ADJUSTMENT METHOD

CROSS-REFERENCE TO RELATED APPLICATION

This application is based upon and claims the benefit of priority of the prior Japanese Patent Application No. 2014-124801, filed on Jun. 17, 2014, the entire contents of which are incorporated herein by reference.

FIELD

The embodiments discussed herein are related to a communication apparatus including a plurality of communication devices for transmitting or receiving signals, and a phase adjustment method for adjusting the phase of a signal passing through each communication device in such communication devices.

BACKGROUND

In a communication apparatus, a plurality of transmitters are used in order to provide directionality to signal radiation characteristics. In this case, the phase difference between the signals output from the respective transmitters is adjusted according to the signal radiation direction. Similarly, in order to provide directionality to signal receive characteristics, the phase difference of received signals is adjusted between a plurality of receivers according to the signal receive direction. When adjusting the phase difference of the signals between the transmitters or receivers, if there are variations among circuit devices such as amplifiers contained in the respective transmitters or receivers, the desired phase difference may not be obtained. In particular, as is the case with signals at millimeter wavelengths, as the wavelength becomes shorter, even a slight shift from the amount of signal delay corresponding to the desired phase difference can result in a larger phase difference error. In view of this, adjusting the phase difference between transmitters by comparing the signals output from the respective transmitters has been proposed (for example, refer to Japanese Laid-open Patent Publication No. 2013-34129).

Japanese Laid-open Patent Publication No. 2013-34129 discloses an inter-branch correction device for a phased-array antenna including a plurality of branches each of which delays the phase of a modulated RF signal and converts the resulting signal into a high-frequency signal for output. This device determines the amount of phase delay in each branch based on the DC component of the output signal obtained by inputting two high-frequency signals output from two adjacent branches into a mixer, and delays the modulated RF signal in one or the other of the branches by the determined amount of phase delay.

SUMMARY

However, there can occur cases where the circuit within the mixer used to compare the high-frequency signals fails to fully complete the operations to be performed on the two high-frequency signals input into the mixer, or where there is a difference in amplitude level between the two high-frequency signals input into the mixer. In such cases, an offset component may be added to the obtained DC component. If this happens, then even if the signal phase in each transmitter is adjusted based on the DC component in order to set the signal phase difference between the transmitters to a predetermined value, the phase difference may not be adjusted to the predetermined value.

According to one embodiment, a communication apparatus is provided. The communication apparatus includes: a plurality of communication devices each of which transmits or receives a signal and each of which includes a phase adjuster for adjusting the phase of the signal; an oscillator which supplies a first signal with a first frequency; a switching device which modulates at least one of the first signal passed through a first communication device among the plurality of communication devices and a second signal with the first frequency but not passed through the first communication device at a second frequency lower than the first frequency; a signal combiner which combines together the first signal passed through the first communication device and the second signal, at least one of which is modulated, to generate a composite signal containing a switching frequency component with an amplitude in response to a phase difference taken between the first signal and the second signal at the second frequency; and a control unit which, based on the switching frequency component contained in the composite signal, obtains as a reference phase adjustment amount a phase adjustment amount applied by the phase adjuster in the first communication device when the phase difference between the first signal and the second signal is at a prescribed value, and which, based on the reference phase adjustment amount, controls the phase adjuster in the first communication device so that a predetermined phase difference is provided between the signal that the first communication device transmits or receives and the signal that a second communication device adjacent to the first communication device among the plurality of communication devices transmits or receives.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A communication apparatus will be described below with reference to the drawings. In order to provide directionality to the radiation characteristics of a high-frequency signal to be radiated from antennas, the communication apparatus includes a plurality of transmitters which output identical high-frequency signals, and adjusts the phase difference of the high-frequency signals between the respective transmitters according to the radiation direction. Therefore, the communication apparatus executes calibration, i.e., the high-frequency signal output from one of two adjacent transmitters is taken as the reference signal, and the phase difference of the high-frequency signal output from the other transmitter, relative to the phase of the reference signal, is adjusted to a predetermined value.

More specifically, the communication apparatus modulates at least one of the high-frequency signals output from the two adjacent transmitters at a switching frequency lower than the frequency of the high-frequency signal. Then, the communication apparatus supplies the modulated radio-frequency signal to a mixer and generates a composite signal containing a component with an amplitude in response to the phase difference between the two input high-frequency signals at the switching frequency. Then, based on the power or the amplitude level of the switching frequency component contained in the composite signal, the communication apparatus adjusts the phase of the high-frequency signal in at least one of the transmitters. In this way, the communication apparatus adjusts the phase difference of the radio-frequency signals between the respective transmitter without being affected by the amplitude level difference between the high-frequency signals or the circuit configuration of the mixer. The high-frequency signal is hereinafter designated an RF signal.

Figure 1:
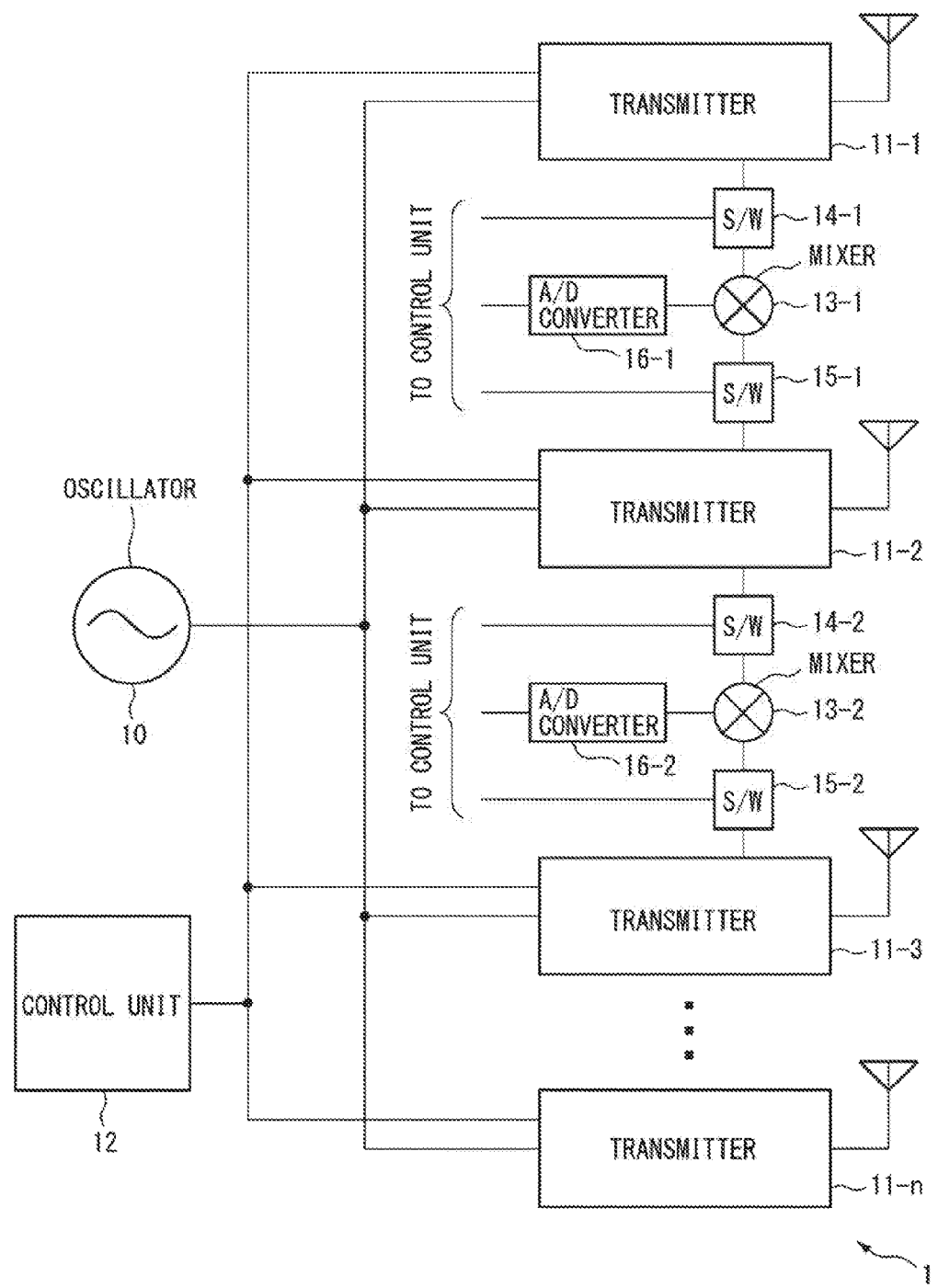
FIG. 1 is a diagram schematically illustrating the configuration of a communication apparatus according to a first embodiment.

FIG. 1 is a diagram schematically illustrating the configuration of a communication apparatus according to a first embodiment. The communication apparatus 1 includes an oscillator 10, a plurality of transmitters 11-1 to 11-$n$ ($n$ is an integer not smaller than 2), and a control unit 12. The communication apparatus 1 further includes mixers 13-1 to 13-$(n-1)$, switches 14-1 to 14-$(n-1)$, switches 15-1 to 15-$(n-1)$, and analog/digital converters 16-1 to 16-$(n-1)$; each of these component elements is provided between any two adjacent transmitters.

The oscillator 10 generates an RF signal. For this purpose, the oscillator 10 includes, for example, one or a plurality of processors, a volatile or nonvolatile memory circuit, and an oscillating circuit. The oscillator 10 generates, for example, a baseband signal with a baseband frequency on which data to be transmitted is superimposed. Then, the oscillator 10 generates the RF signal by modulating the baseband signal on a carrier, for example, in accordance with a modulation scheme defined in a wireless communication standard to which the communication apparatus 1 conforms.

Each of the transmitters 11-1 to 11-$n$ is an example of a communication device which transmits or receives an RF signal, and the RF signal received from the oscillator 10 is output as a radio wave from each transmitter. It is preferable to arrange the transmitters 11-1 to 11-$n$ so that the antennas provided on the respective transmitters are equally spaced between any two adjacent transmitters. Then, the transmitters 11-1 to 11-$n$ provide directionality to the radiation characteristics of the radio waves by providing a phase difference appropriate to a predetermined radiation direction between the RF signals output from the two adjacent transmitters in accordance with a control signal supplied from the control unit 12.

The control unit 12 includes, for example, a processor and a nonvolatile memory circuit and, in order to provide directionality to the radiation characteristics of the radio waves, controls the phase and amplitude of the RF signal passing through each transmitter. For this purpose, the control unit 12 controls a phase adjuster and an amplitude adjuster contained in each transmitter.

The mixer 13-$m$ ($m=1, 2, \ldots, (n-1)$) is connected to the transmitter 11-$m$ via the switch 14-$m$ and to the transmitter 11-$(m+1)$ via the switch 15-$m$. The RF signal passed through the transmitter 11-$m$ is input via the switch 14-$m$ into the mixer 13-$m$, and the RF signal passed through the transmitter 11-$(m+1)$ is input via the switch 15-$m$ into the mixer 13-$m$. Then, the mixer 13-$m$ combines the two RF signals and outputs the resulting composite signal. The composite signal output from the mixer 13-$m$ is converted by the analog/digital converter 16-$m$ into a digital signal which is supplied to the control unit 12.

Each mixer, each switch, and each analog/digital converter are used when executing calibration. The calibration process according to the present embodiment is a process for obtaining a reference phase adjustment amount that serves as a reference for the phase adjustment amount by which to adjust the phase of the RF signal in each transmitter. Each mixer, each switch, and each analog/digital converter will be described in detail later in conjunction with the calibration process.

Figure 2:
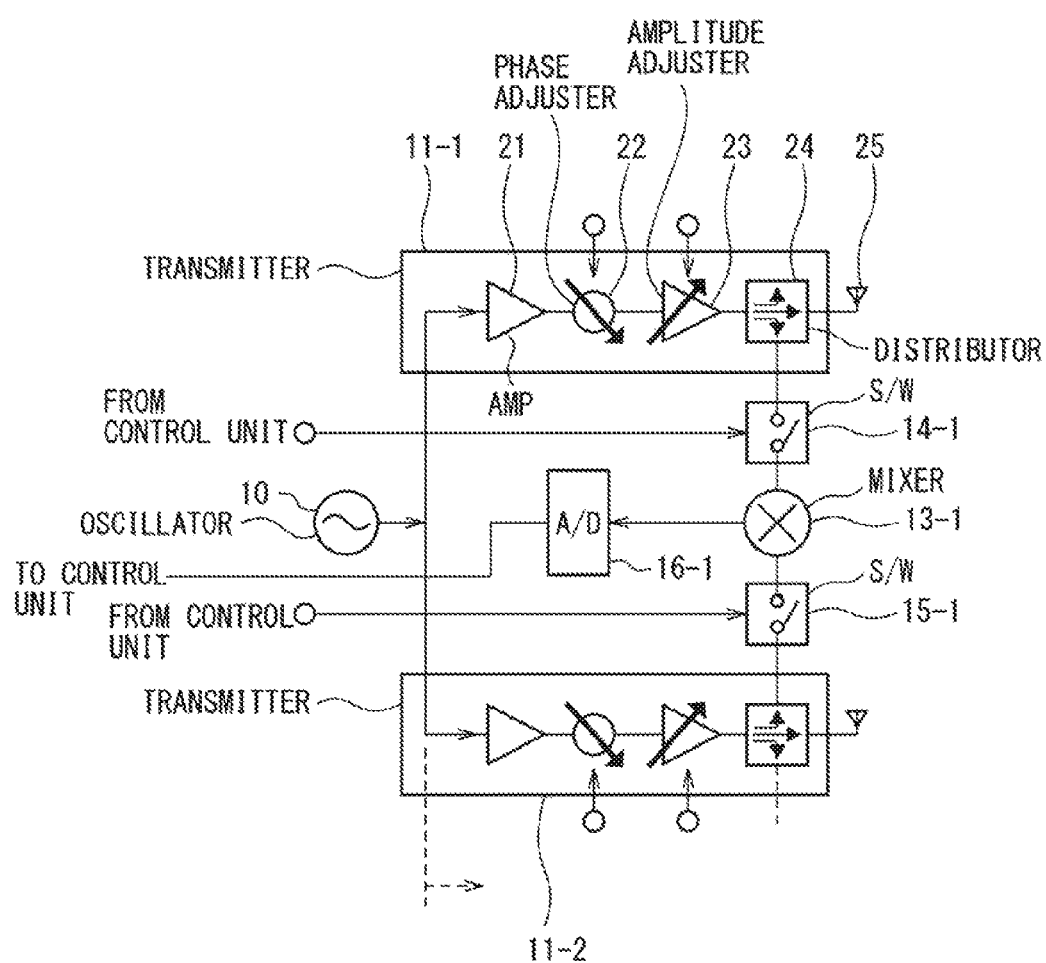
FIG. 2 is a circuit block diagram of a calibration process execution unit.

FIG. 2 is a circuit block diagram of a calibration process execution unit. The execution unit for executing the calibration process includes two adjacent transmitters, one mixer and two switches to which the RF signals from the two transmitters are respectively input, and one analog/digital converter. In the example of FIG. 2, the execution unit includes the transmitters 11-1 and 11-2.

As depicted in FIG. 2, each of the transmitters 11-1 and 11-2 includes an amplifier 21, a phase adjuster 22, an amplitude adjuster 23, a distributor 24, and an antenna 25. The other transmitters are identical in configuration to the transmitters 11-1 and 11-2. The following description deals with the transmitter 11-1.

The amplifier 21 amplifies the RF signal supplied from the oscillator 10. For this purpose, the amplifier 21 includes, for example, a nonlinear amplifier and a distortion compensating circuit which compensates for signal waveform distortion occurring in the nonlinear amplifier. The amplifier 21 outputs the amplified RF signal.

The phase of the RF signal amplified by the amplifier 21 is adjusted by the phase adjuster 22 in accordance with a control signal supplied from the control unit 12. For this purpose, the phase adjuster 22 includes, for example, a variable delay circuit that can variably adjust the amount of delay to be applied to the input RF signal in accordance with the control signal. The phase adjuster 22 outputs the amplified, phase-adjusted RF signal.

The amplitude adjuster 23 adjusts the amplitude level of the amplified, phase-adjusted RF signal in accordance with a control signal supplied from the control unit 12. For this purpose, the amplitude adjuster 23 includes, for example, a variable amplifier or a variable attenuator. The amplitude adjuster 23 outputs the amplified, phase-adjusted, and amplitude-adjusted RF signal.

The distributor 24 distributes the amplified, phase-adjusted, and amplitude-adjusted RF signal to the antenna 25 and the mixer 13-1. Then, the portion of the amplified, phase-adjusted, and amplitude-adjusted RF signal, distributed via the distributor 24 to the antenna 25, is radiated from the antenna 25 as a radio wave.

The other portion of the amplified, phase-adjusted, and amplitude-adjusted RF signal, separated by the distributor 24, is input into the mixer 13-1 via the switch 14-1. In like manner, the other portion of the amplified, phase-adjusted, and amplitude-adjusted RF signal, separated by the distributor 24 in the transmitter 11-2, is input into the mixer 13-1 via the switch 15-1. For convenience of explanation, the amplified, phase-adjusted, and amplitude-adjusted RF signal output from the distributor 24 will hereinafter be also referred to simply as the RF signal.

Each of the switches 14-1 and 15-1 is an example of a switching device, and each may be constructed from a transistor or a field-effect transistor (FET). Each of the switches 14-1 and 15-1 is turned on and off in accordance with a control signal applied from the control unit 12. During communication, the switches 14-1 and 15-1 are both turned off. During communication, the RF signals are not input into the mixer 13-1.

On the other hand, when executing the calibration process, the control signal for turning on and off at a switching frequency lower than the RF signal frequency, i.e., the frequency of the RF signal carrier, is applied to the switches 14-1 and 15-1. As a result, the RF signals passing through the switches 14-1 and 15-1, respectively, are modulated at the switching frequency.

The mixer 13-1 is one example of a composite signal generator, and is disposed so that the difference between the signal line length from the transmitter 11-1 to the mixer 13-1 and the signal line length from the transmitter 12-1 to the mixer 13-1 becomes equal to an integral multiple of the RF signal wavelength. For example, the mixer 13-1 is disposed so that the signal line length from the transmitter 11-1 to the mixer 13-1 is equal to the signal line length from the transmitter 11-2 to the mixer 13-1. As a result, when the RF signal output from the transmitter 11-1 and the RF signal output from the transmitter 11-2 are identical in phase, the two RF signals input into the mixer 13-1 are also identical in phase.

In the present embodiment, when executing the calibration process, the mixer 13-1 generates the composite signal by multiplying together the RF signal modulated by the switch 14-1 and the RF signal modulated by the switch 15-1. The mixer 13-1 outputs the generated composite signal.

The analog/digital converter (hereinafter referred to as the A/D converter) 16-1 converts the composite signal output from the mixer 13-1 into a digital signal by sampling the composite signal at a predetermined sampling frequency. The sampling frequency is set equal to or higher than twice the switching frequency so that the switching frequency component with the switching frequency can be extracted from the digitized composite signal. Further, it is preferable to set the sampling frequency lower than the frequency of the RF signal carrier so that the component with the frequency of the RF signal carrier, contained in the composite signal, is cut off. The digitized composite signal output from the A/D converter 16-1 is supplied to the control unit 12.

When executing the calibration process, the control unit 12 supplies the control signal to the switches 14-1 and 15-1 so that the phase of the on/off switching operation of the switch 14-1 and the phase of the on/off switching operation of the switch 15-1 become identical to each other. Then, the control unit 12 extracts the switching frequency component from the composite signal. Then, based on the switching frequency component, the control unit 12 controls the phase adjustment amount to be applied by the phase adjuster 22 in at least one of the two transmitters 11-1 and 2-2, for example, in such a manner as to minimize the power or the amplitude level of the switching frequency component.

The RF signal output from the transmitter 11-1 and the RF signal output from the transmitter 11-2 are respectively expressed by the following equations.

$$x = A \cos(\omega t + \alpha)$$
$$y = B \cos(\omega t + \beta) \quad (1)$$

where A and B represent the amplitudes of the respective RF signals. Further, ω represents the frequency of the RF signal carrier. On the other hand, a and p each represent the offset of the phase of the corresponding RF signal at the time the signal is input into the mixer 13-1.

The switching signal $S_c$ superimposed on the RF signal by turning on and off the switches 14-1 and 15-1 is expressed by the following equation.

$$s_c = \frac{1}{2} + r(\omega_s t) \quad (2)$$

$$r(\omega_s t) = \frac{4}{\pi} \sum_{k=1}^{\infty} \frac{\sin\{(2k-1)\omega_s t\}}{2k-1}$$

where $\omega_s$ is the switching frequency.

The control unit 12 controls the switches 14-1 and 15-1 so that the switches 14-1 and 15-1 are turned on and off in phase. For convenience, such control will hereinafter be referred to as the in-phase control. In this case, the composite signal output from the mixer 13-1 is expressed by the following equation.

$$Z_{xy} = XY = (xs_c) \cdot (ys_c) \quad (3)$$
$$= AB \cdot \cos(\omega t + \alpha) \cdot \cos(\omega t + \beta) \cdot s_c^2$$

If the multiplication of the two RF signals fails to be performed correctly due to imperfection of the circuit of the mixer 13-1, the composite signal output from the mixer 13-1 is expressed by the following equation.

$$Z_{xy} = XY = (xs_c) \cdot (ys_c) + \gamma_{xy} \quad (4)$$
$$= AB \cdot \cos(\omega t + \alpha) \cdot \cos(\omega t + \beta) \cdot s_c^2 + \gamma_{xy}$$

where $\gamma_{xy}$ is the offset term arising due to the imperfection of the circuit of the mixer 13-1.

The term of the square of the switching signal $S_c$ can be approximated as follows.

$$s_c^2 = \left(\frac{1}{2} + r\right)^2 \quad (5)$$

$$= r^2 + r + \frac{1}{4}$$

$$\cong \frac{1}{4} + r + \frac{1}{4}$$

$$= r + \frac{1}{2}$$

In this case, the composite signal output from the mixer 13-1, expressed by the equation (4), is approximately expressed by the following equation.

$$Z_{xy} \cong \frac{AB}{2} \cdot \{\cos(2\omega t + \alpha + \beta) + \cos(\alpha - \beta)\} \cdot \left(r + \frac{1}{2}\right) + \gamma_{xy} \quad (6)$$

In this composite signal, the component with the frequency ω of the RF signal carrier is cut off by the A/D converter 16-1. Therefore, the DC component contained in the composite signal input to the control unit 12 is approximately expressed by the following equation.

$$\text{DC component of } Z_{XY} \cong \frac{AB}{4} \cdot \cos(\alpha - \beta) + \gamma_{xy} \quad (7)$$

On the other hand, the switching frequency component contained in the composite signal input to the control unit 12 is approximately expressed by the following equation.

$$\omega_s \text{ component of } Z_{XY} \cong \frac{AB}{2} \cdot \cos(\alpha - \beta) \cdot r \quad (8)$$

As can be seen from the equation (8), when the phase difference (α−β) between the RF signal output from the transmitter 11-1 and the RF signal output from the transmitter 11-2 is +90° or −90°, the switching frequency component becomes 0, irrespective of the offset term $\gamma_{xy}$ or the amplitude of the RF signal.

The control unit 12 takes as the reference signal the RF signal output, for example, from whichever one of the transmitters 11-1 and 11-2 has been calibrated. Then, while holding unchanged the phase of the RF signal for the transmitter outputting the reference signal, the control unit 12 varies the phase adjustment amount in increments of a predetermined number of degrees (for example, 1°) through 360° for the RF signal whose phase is to be adjusted by the phase adjuster 22 in the other transmitter. Then, for each phase adjustment amount, the control unit 12 stores the amplitude level or the power of the switching frequency component. The control unit 12 can extract the switching frequency component, for example, by applying a fast Fourier transform (FFT) to the signal output from the A/D converter 16-1. The control unit 12 may include a detector circuit that can extract the switching frequency component from the composite signal. When the amplitude level or the power of the switching frequency component is reduced to a minimum, the control unit 12 determines that the phase difference (α−β) between the RF signals output from the respective transmitters 11-1 and 11-2 is +90° or −90°. The control unit 12 stores as the reference phase adjustment amount the phase adjustment amount when the phase difference (α−β) becomes +90° or −90°. When the value of the composite signal input to the control unit 12 decreases as the phase difference increases before and after the minimum value of the switching frequency component, the phase difference corresponding to the minimum value is +90°. On the other hand, when the value of the composite signal input to the control unit 12 increases as the phase difference increases before and after the minimum value of the amplitude level or the power of the switching frequency component, the phase difference corresponding to the minimum value is −90°.

Figure 3:
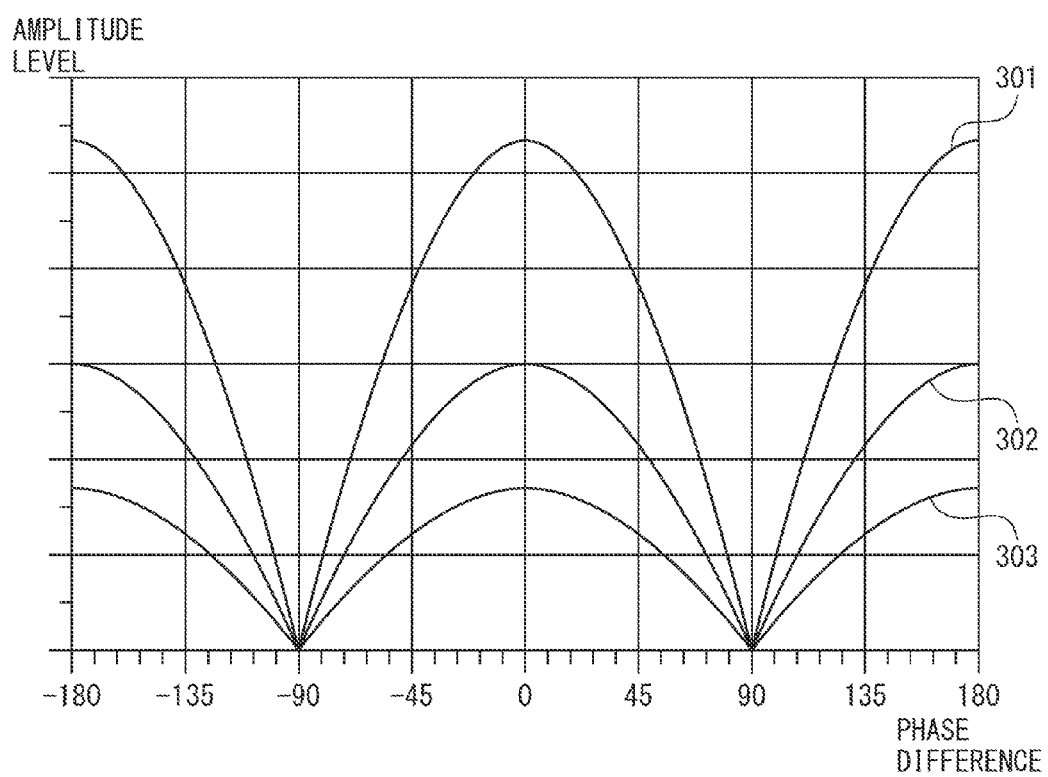
FIG. 3 is a diagram illustrating one example of the relationship between a switching frequency component and the phase difference between RF signals.

FIG. 3 is a diagram illustrating one example of the relationship between the switching frequency component and the phase difference between the RF signals. In FIG. 3, the phase difference is plotted along the abscissa and the amplitude level of the switching frequency component along the ordinate. Graphs 301 and 303 depict the relationship between the phase difference and the amplitude level of the switching frequency component when the amplitude level difference between the RF signals output from the two transmitters is +5 dB, 0 dB, and −5 dB, respectively. It is assumed that the amplitude level difference is positive when A>B in the equation (8). As can be seen from the graphs 301 to 303, even if there is an amplitude level difference between the two RF signals input into the mixer 13-1, i.e., even if there is a power difference, the switching frequency component decreases to a minimum when the phase difference is +90° and −90°.

As depicted in FIG. 3, the rate of change of the amplitude level or the power with respect to the change of the phase difference (α−β) between the two RF signals is the greatest near the point where the amplitude level or the power of the switching frequency component is minimum. Accordingly, by taking as the reference phase adjustment amount the phase adjustment amount when the amplitude level or the power of the switching frequency component is at a minimum, the control unit 12 can obtain the reference phase adjustment amount with high accuracy.

As can be seen from FIG. 3, when the amplitude level or the power of the switching frequency component is at a maximum, the phase difference (α−β) is 0° or 180°. In view of this, according to a modified example, the control unit 12 may obtain as the reference phase adjustment amount the phase adjustment amount when the amplitude level or the power of the switching frequency component is at a maximum. Further, since there is a constant relationship between the amplitude level or the power of the switching frequency component and the phase difference (α−β) between the two RF signals, as depicted in FIG. 3, the phase difference (α−β) when the amplitude level or the power of the switching frequency component is at any given value can also be determined. In view of this, the control unit 12 may obtain as the reference phase adjustment amount the phase adjustment amount when the amplitude level or the power of the switching frequency component is at a given value between the maximum and minimum values.

After the phase adjustment amount when the phase difference between the RF signals is +90° or −90° has been stored for one or the other of the transmitters in the pair of two adjacent transmitters, the control unit 12 proceeds to execute the same calibration process for a pair of two adjacent transmitters adjacent to the first pair of transmitters. For example, first the control unit 12 executes the calibration process for the pair of the transmitters 11-1 and 11-2. Then, the control unit 12 controls the phase adjuster 22 in the transmitter 11-2, and stores the phase adjustment amount for the transmitter 11-2 when the phase difference between the RF signal output from the transmitter 11-1 and the RF signal output from the transmitter 11-2 is +90° or −90°. Next, the control unit 12 proceeds to execute the calibration process for the pair of the transmitters 11-2 and 11-3. Then, the control unit 12 controls the phase adjuster 22 in the transmitter 11-3, and stores the phase adjustment amount for the transmitter 11-3 when the phase difference between the RF signal output from the transmitter 11-2 and the RF signal output from the transmitter 11-3 is +90° or −90°. Alternatively, the control unit 12 may first execute the calibration process for the pair of two transmitters located in the center of the array of the plurality of transmitters. Then, the control unit 12 may proceed to execute the calibration process for each pair of transmitters located on both sides of the first pair of transmitters in sequence starting with the pair located closest to the first pair. In this way, the control unit 12 need only execute the calibration process for each pair or transmitters in a prescribed sequence.

Suppose that after the calibration process has been completed for all pairs of transmitters, the communication apparatus 1 transmits the RF signal in a designated transmission direction. In this case, the control unit 12 controls the phase adjuster 22 in each transmitter so that a phase difference appropriate to the designated transmission direction is provided between the RF signals output from the two adjacent transmitters. At this time, the control unit 12 can determine the phase adjustment amount corresponding to the phase difference appropriate to the designated transmission direction by referring to the phase adjustment amount taken as the reference phase adjustment amount when the phase difference is +90° or −90°. For example, when the phase difference appropriate to the designated transmission direction is 0°, the control unit 12 may obtain the phase adjustment amount corresponding to the midpoint between the phase adjustment amount for the phase difference of +90° and the phase adjustment amount for the phase difference of −90°.

Figure 4:
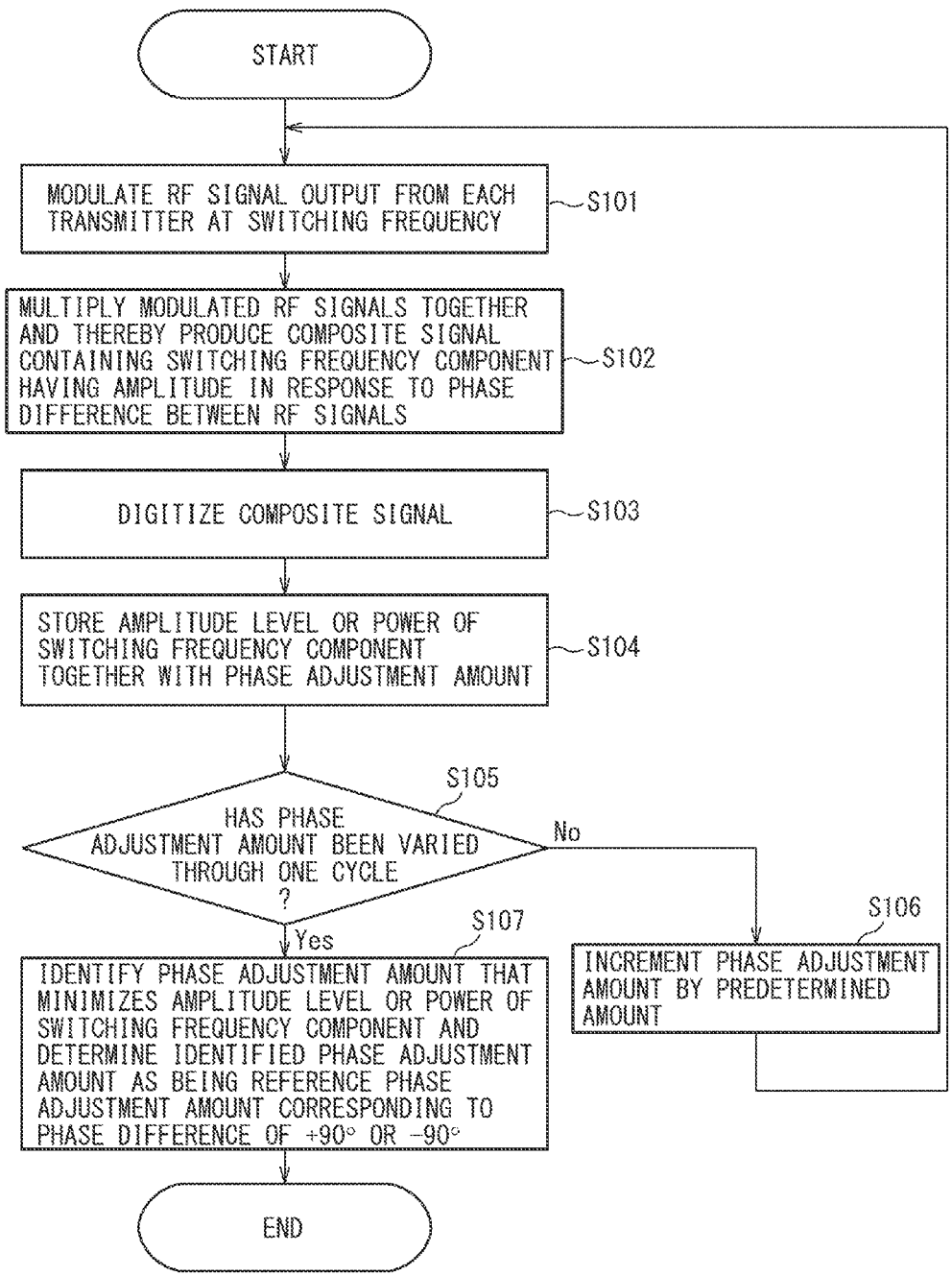
FIG. 4 is an operation flowchart illustrating a calibration process.

FIG. 4 is an operation flowchart illustrating the calibration process executed by the communication apparatus 1. The communication apparatus 1 executes the calibration process in accordance with the operation flowchart for each pair of two adjacent transmitters.

The control unit 12 modulates the RF signals output from two transmitters 11-*m* and 11-(m+1) at a switching frequency lower than the frequency of the RF signal carrier by using the switches 14-*m* and 14-(m+1), respectively (step S101). The mixer 13-*m* multiplies together the two RF signals modulated at the switching frequency and thereby produces the composite signal containing the switching frequency component with an amplitude in response to the phase difference between the two RF signals (step S102). The A/D converter 16-*m* digitizes the composite signal output from the mixer 14-*m* by sampling the composite signal at a sampling frequency not lower than twice the switching frequency but lower than the frequency of the RF signal carrier (step S103). The control unit 12 extracts the switching frequency component from the digitized composite signal, and stores the amplitude level or the power of the switching frequency component together with the phase adjustment amount obtained for at least one transmitter designated as the transmitter to be adjusted (step S104).

The control unit 12 determines whether the phase adjustment amount for the transmitter designated as the transmitter to be adjusted has been varied through one cycle, i.e., through 360°, since the start of the calibration (step S105). If the amount by which the phase adjustment amount has been varied is short of one cycle (No in step S105), the control unit 12 increments the phase adjustment amount by a predetermined amount (step S106). Then, the communication unit 1 returns to step S101 to repeat the above process.

When the phase adjustment amount has been varied through one cycle (Yes in step S105), the control unit 12 identifies the phase adjustment amount that minimizes the amplitude level or the power of the switching frequency component from among the stored phase adjustment amounts, and determines the identified phase adjustment amount as being the phase adjustment amount when the phase difference between the two RF signals becomes +90° or −90°. Then, the control unit 12 stores the identified phase adjustment amount as the reference phase adjustment amount to be used for phase difference adjustment for the transmitter designated as the transmitter to be adjusted (step S107). Thereafter, the communication apparatus 1 terminates the calibration process.

Figure 5:
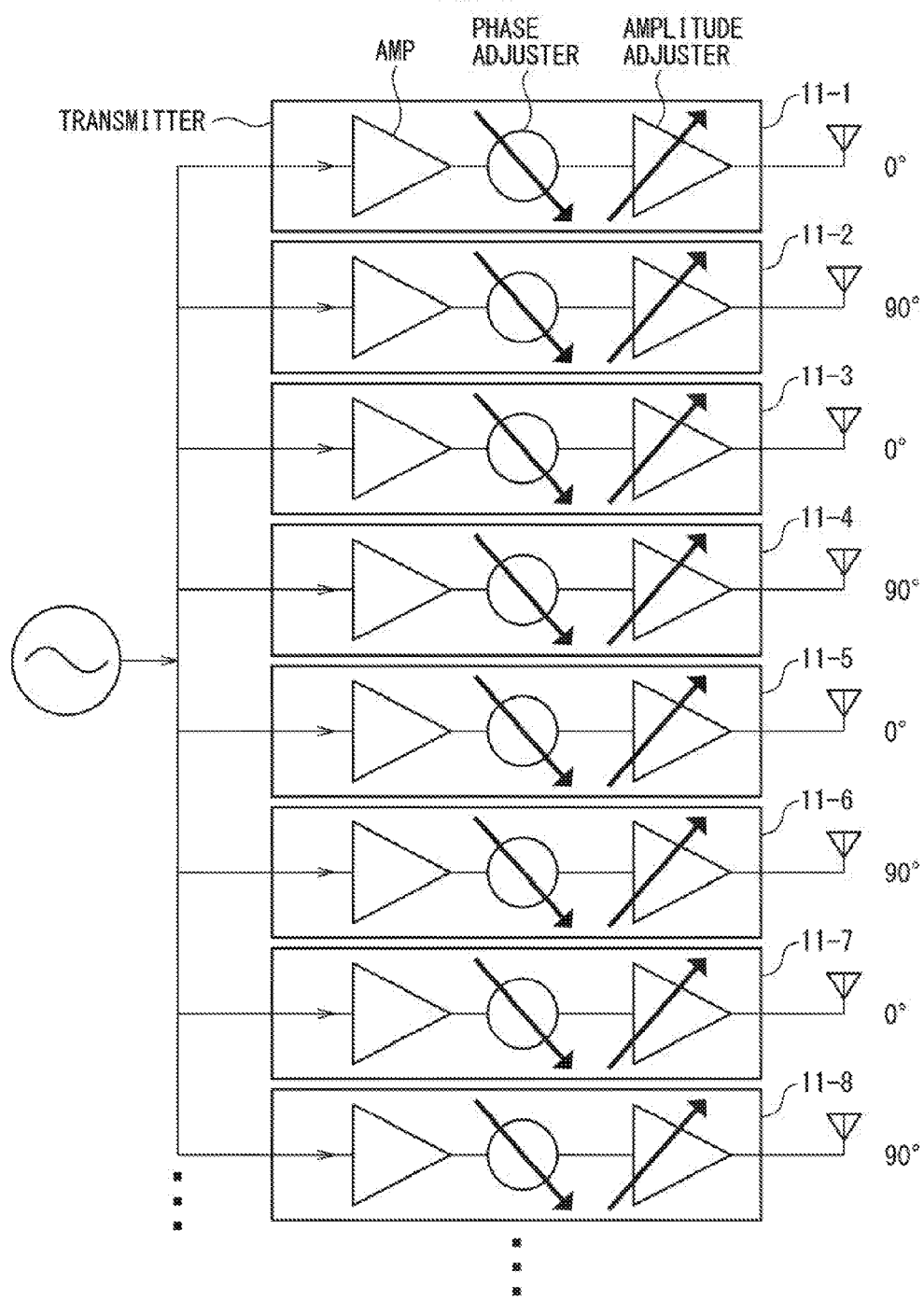
FIG. 5 is a diagram illustrating one example of the phases of the RF signals output from transmitters when the calibration process has been executed for all the pairs of two adjacent transmitters.

FIG. 5 is a diagram illustrating one example of the phases of the RF signals output from the respective transmitters when the above calibration process has been executed for all the pairs of two adjacent transmitters. In this example, the phase of the RF signal output from each given transmitter, relative to the phase of the RF signal output from the transmitter 11-1, is indicated at the right of the given transmitter. In the illustrated example, the phase difference is adjusted for each pair of transmitters so that the phase difference between the RF signals output from two adjacent transmitters alternates between +90° and −90°. As a result, the phase of the RF signal output from any given transmitter, relative to the phase of the RF signal output from the transmitter 11-1, alternates between 0° and 90°. Accordingly, by causing every other transmitter (for example, transmitters 11-1, 11-3, 11-5, . . . ) to output the RF signal, the communication apparatus 1 can radiate the RF signal in the direction straight ahead.

Figure 6:
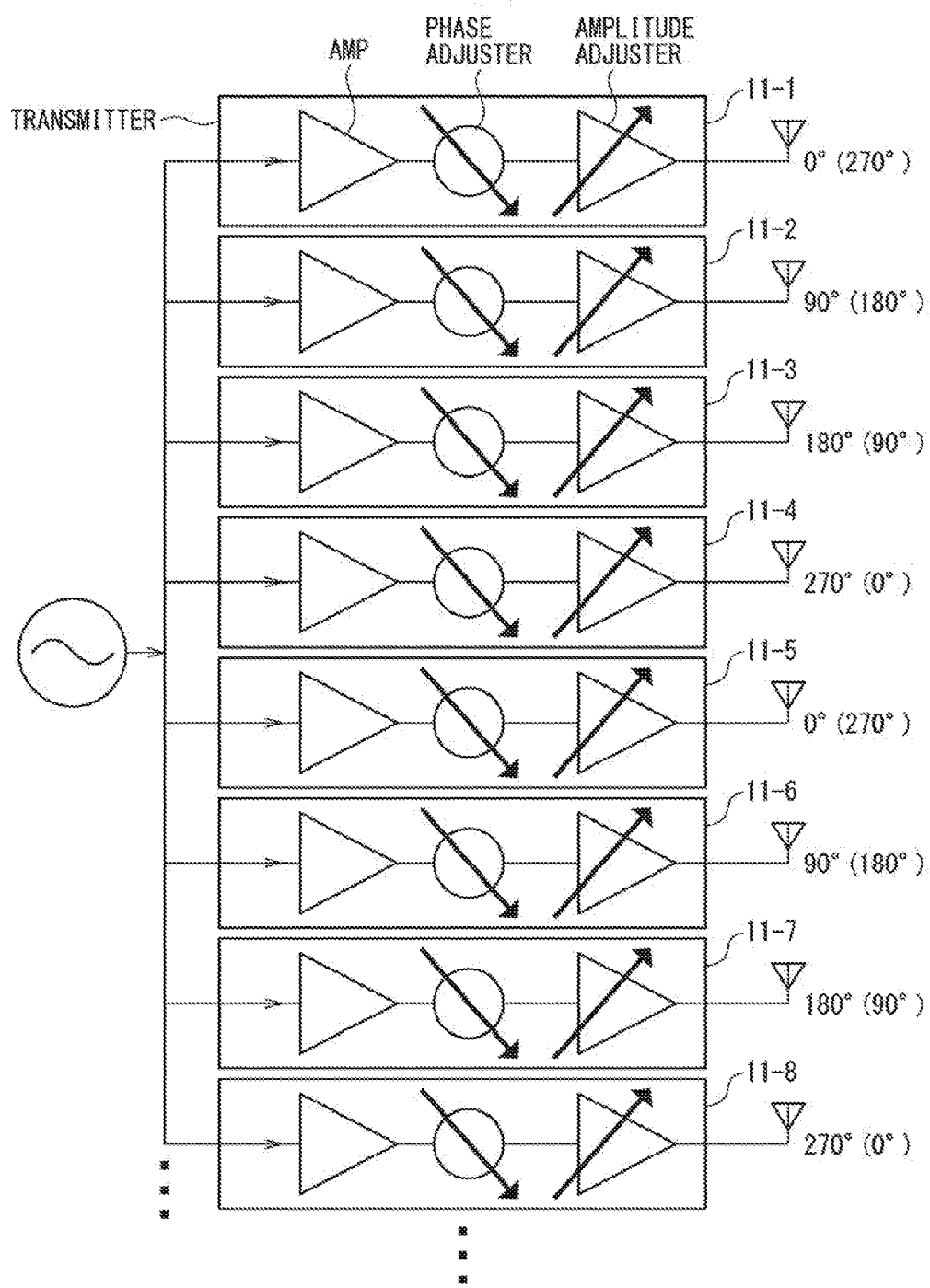
FIG. 6 is a diagram illustrating another example of the phases of the RF signals output from transmitters when the calibration process has been executed for all the pairs of two adjacent transmitters.

FIG. 6 is a diagram illustrating another example of the phases of the RF signals output from the respective transmitters when the above calibration process has been executed for all the pairs of two adjacent transmitters. In this example, the phase of the RF signal output from each given transmitter, relative to the phase of the RF signal output from the transmitter 11-1, is indicated at the right of the given transmitter. In the illustrated example, however, the phase difference is adjusted for each pair of transmitters so that the phase difference between the RF signals output from two adjacent transmitters is either +90° or −90° for any pair. As a result, the phase of the RF signal output from any given transmitter, relative to the phase of the RF signal output from the transmitter 11-1, increases in increments of 90° as the distance from the transmitter 11-1 increases in increments of 90° or decreases in increments of 90° as indicated in parentheses. Accordingly, by causing every transmitter to output the RF signal, the communication apparatus 1 can radiate the RF signal in a specific direction rotated to the right or rotated to the left.

As has been described above, the communication apparatus adjusts the phase difference between the RF signals output from any two adjacent transmitters, based on the switching frequency component of the composite signal that is affected by neither the imperfection of the mixer nor the amplitude difference between the RF signals output from the two transmitters. Accordingly, the communication apparatus can accurately adjust the phase difference between the RF signals output from any two adjacent transmitters, even if the mixer for mixing the RF signals output from the two transmitters is imperfect or if there is an amplitude difference between the RF signals output from the two transmitters.

Next, a communication apparatus according to a second embodiment will be described. If there is a difference in power between the RF signals output from the respective transmitters, the shape of the radio wave beam radiated from the communication apparatus 1 may deviate from the desired shape. It is therefore preferable that the RF signals output from the respective transmitters have the same amplitude level. In view of this, the communication apparatus according to the second embodiment adjusts both the phase difference and amplitude level difference between the RF signals output from the respective transmitters by using a mixer of the type that outputs a signal containing a square-law detection component of the two input signals.

The communication apparatus according to the second embodiment differs from the communication apparatus according to the first embodiment in the type of the mixer used and the processing that the control unit performs when executing the calibration process. Therefore, the mixer and the control unit will be described below. Since the mixers used in the communication apparatus are identical in configuration, the following description deals with the mixer 13-1. For the other component elements constituting the communication apparatus of the second embodiment, refer to the description earlier given of the corresponding component elements constituting the communication apparatus of the first embodiment.

In the present embodiment, the mixer 13-1 includes a double-balanced mixer of the type that outputs a square-law detection component of two input signals, a subtractor, and an adder. In this example, the RF signal output from the transmitter 11-1 and modulated by the switch 14-1 and the RF signal output from the transmitter 11-2 and modulated by the switch 15-1 are differentially input to the double-balanced mixer. Then, the double-balanced mixer outputs a signal corresponding to the square of the sum of the two input RF signals and a signal corresponding to the square of the difference between the two input RF signals. The subtractor outputs a differential composite signal by taking the difference between the signal corresponding to the square of the sum of the two RF signals and the signal corresponding to the square of the difference between the two RF signals. On the other hand, the adder outputs an in-phase composite signal by taking the sum between the signal corresponding to the square of the sum of the two RF signals and the signal corresponding to the square of the difference between the two RF signals. Then, the differential composite signal and the in-phase composite signal are respectively digitized by the A/D converter and supplied to the control unit 12.

When adjusting the phase difference between the RF signals output from the two transmitters, the control unit 12 performs control to synchronize the switches 14-1 and 15-1 in phase. In this case, the two output signals from the double-balanced mixer are respectively expressed by the following equations.

$$Z_+ = (X+Y)^2$$

$$Z_- = (X-Y)^2$$

$$X=(xs_c)=A \cos(\omega t+\alpha)\cdot s_c$$

$$Y=(ys_c)=B \cos(\omega t+\beta)\cdot s_c \qquad (9)$$

where X and Y are the RF signal modulated by the switch 14-1 and the RF signal modulated by the switch 15-1, respectively.

Figure 7:
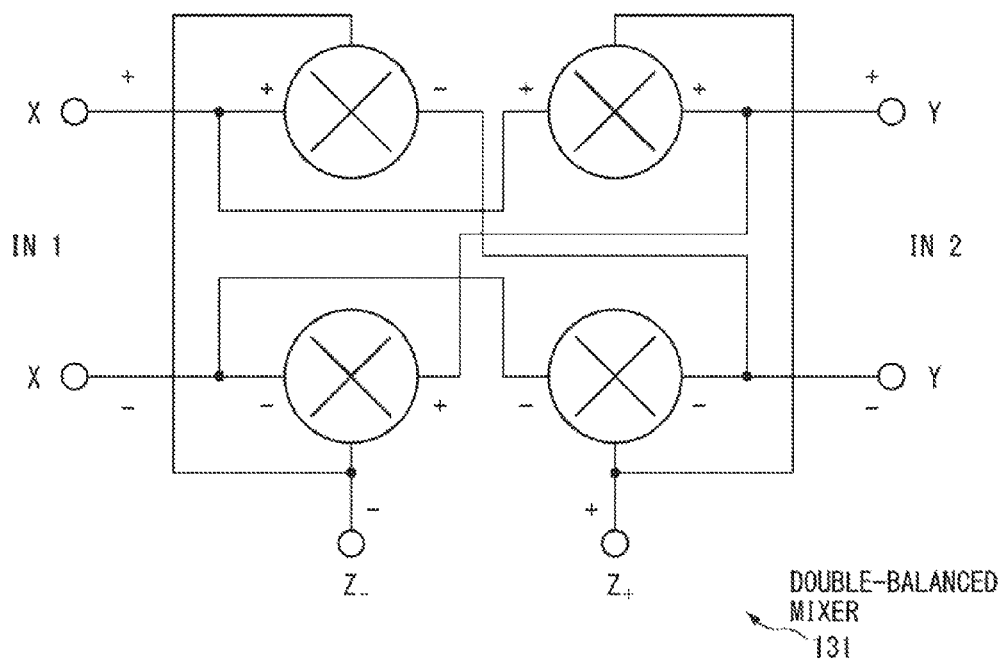
FIG. 7 is a circuit block diagram of a mixer used according to a modified example.

FIG. 7 is a circuit block diagram of the double-balanced mixer used in the above modified example. The RF signal modulated by the switch 14-1 is differentially input to one input terminal IN1 of the double-balanced mixer 131, while the RF signal modulated by the switch 15-1 is input to the other input terminal IN 2. Then, the square $Z_+$ of the sum of the input RF signals X and Y is output from one output terminal OUT, and the square $Z_-$ of the difference between the input RF signals X and Y is output from the other output terminal OUT.

Since the differential composite signal output from the mixer 13-1 is given by $(Z_+-Z_-)$, the switching frequency component contained in the differential composite signal is approximately expressed by the following equation.

$$\omega_s \text{component of } Z_+-Z_- \cong 2AB\cdot\cos(\alpha-\beta)\cdot r \qquad (10)$$

Accordingly, in this embodiment, when the phase difference $(\alpha-\beta)$ between the two RF signals is +90° or −90°, the amplitude level or the power of the switching frequency component is at a minimum. Therefore, as in the first embodiment, the control unit 12 examines the amplitude level or the power of the switching frequency component while varying the phase difference $(\alpha-\beta)$ between the two RF signals by controlling the phase adjuster in at least one of the transmitters. Then, the control unit 12 determines that the phase adjustment amount that minimizes the amplitude level or the power of the switching frequency component is the phase adjustment amount corresponding to the phase difference of +90° or −90°. In this embodiment, the control unit 12 may obtain as the reference phase adjustment amount the phase adjustment amount corresponding to the phase difference $(\alpha-\beta)$ that occurs when the amplitude level of the switching frequency component is at some other value, for example, at a maximum value.

Further, the control unit 12 adjusts the amplitude level of the RF signal output from at least one of the transmitters so that the RF signals output from the two transmitters have the same amplitude level. To achieve this, the control unit 12 controls the switches 14-1 and 15-1 so as to reverse the phase of the on/off switching period between the switches 14-1 and 15-1. For convenience, such control will hereinafter be referred to as the anti-phase control. In this case, the in-phase composite signal output from the mixer 13-1 is expressed by the following equation.

$$Z_+ + Z_- \qquad (11)$$

$$Z_+ = (X+Y)^2$$

$$Z_- = (X+Y)^2$$

$$X = x\cdot s_c$$

$$Y = y\cdot s_d$$

$$s_c = \frac{1}{2} + r(\omega_s t)$$

$$s_d = \frac{1}{2} - r(\omega_s t)$$

$$r(\omega_s t) = \frac{4}{\pi}\sum_{k=1}^{\infty}\frac{\sin\{(2k-1)\omega_s t\}}{2k-1}$$

Accordingly, the switching frequency component contained in the in-phase composite signal input to the control unit 12 is approximately expressed by the following equation.

$$\omega_s \text{ component of } Z \cong \left[\frac{1}{2}(A^2 - \beta^2)\right] \cdot r \qquad (12)$$

As is apparent from the equation (12), when the amplitude levels of the two RF signals are the same, the amplitude level or the power of the switching frequency component is at a minimum, i.e., at 0. Therefore, the control unit 12 examines the amplitude level or the power of the switching frequency component while varying the amplitude level difference (A–B) between the two RF signals by controlling the amplitude adjuster 23 in at least one of the transmitters. Then, the control unit 12 determines that the amplitude adjustment amount that minimizes the amplitude level or the power of the switching frequency component is the amplitude adjustment amount when the amplitude levels of the two RF signals are the same. Alternatively, the control unit 12 may obtain the amplitude adjustment amount corresponding to the amplitude level difference (A–B) that occurs when the amplitude level of the switching frequency component is at some other value, for example, at a maximum value.

Figure 8:
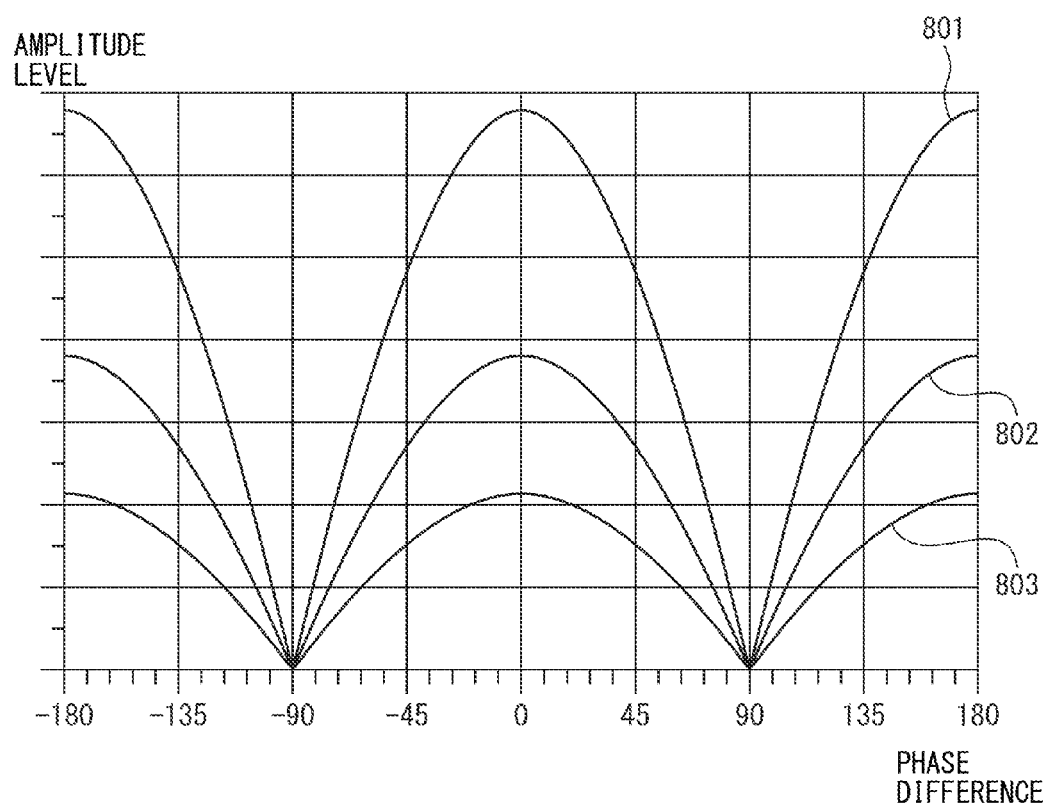
FIG. 8 is a diagram illustrating one example of the relationship between the switching frequency component and the phase difference between the RF signals according to the modified example.

FIG. 8 is a diagram illustrating one example of the relationship between the switching frequency component and the phase difference between the RF signals according to the above modified example. In FIG. 8, the phase difference is plotted along the abscissa and the amplitude level [dB] of the switching frequency component along the ordinate. Graphs 801 and 803 depict the relationship between the phase difference and the amplitude level of the switching frequency component when the amplitude level difference between the RF signals output from the two transmitters is +5 dB, 0 dB, and −5 dB, respectively. It is assumed that the amplitude level difference is positive when A>B in the equation (10). As can be seen from the graphs 801 to 803, even if there is an amplitude level difference between the two RF signals input into the mixer 13-1, i.e., even if there is a power difference, the switching frequency component decreases to a minimum when the phase difference is +90° and −90°.

Figure 9:
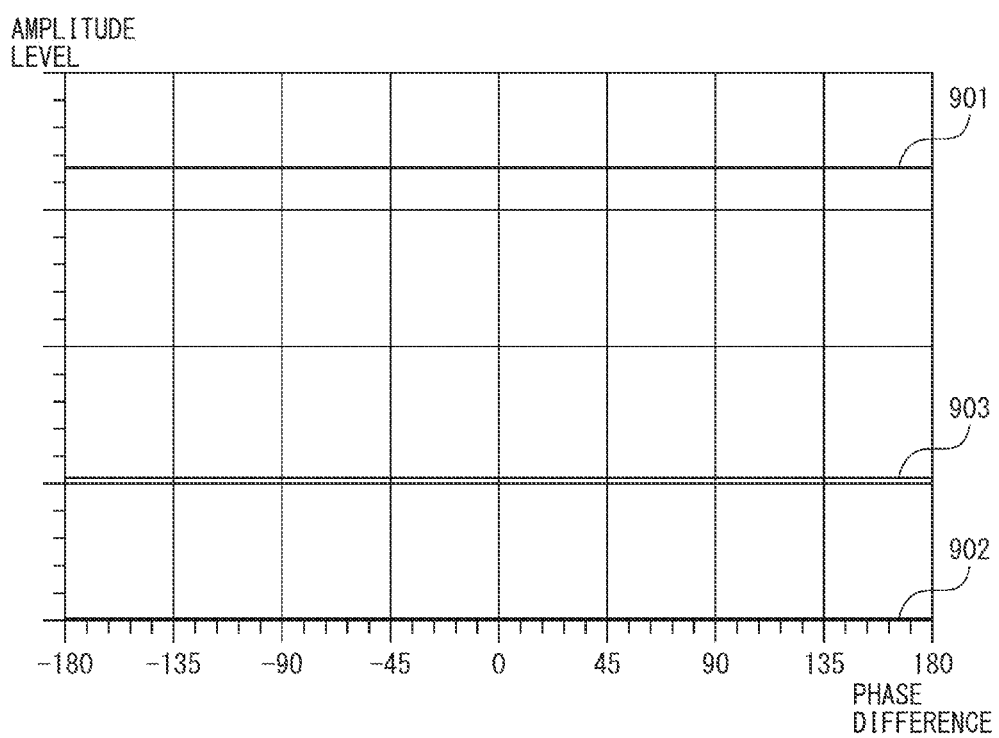
FIG. 9 is a diagram illustrating one example of the relationship between the switching frequency component and the amplitude level difference between the RF signals according to the modified example.

FIG. 9 is a diagram illustrating one example of the relationship between the switching frequency component and the amplitude level difference between the RF signals according to the above modified example. In FIG. 9, the phase difference is plotted along the abscissa and the amplitude level [dB] of the switching frequency component along the ordinate. Graphs 901 and 903 depict the amplitude level of the switching frequency component when the amplitude level difference between the RF signals output from the two transmitters is +5 dB, 0 dB, and −5 dB, respectively. It is assumed that the amplitude level difference is positive when A>B in the equation (12). As can be seen from the graphs 901 to 903, the smaller the amplitude level difference between the two RF signals input into the mixer 13-1, the smaller is the amplitude level of the switching frequency component.

For one or the other of the transmitters in the pair of two adjacent transmitters, the control unit 12 stores the phase adjustment amount when the phase difference between the RF signals is +90° or −90° and the amplitude adjustment amount when the amplitude levels of the two RF signals become the same, as described above. After that, the control unit 12 proceeds to execute the same calibration process for each of two pairs adjacent to the first transmitter pair. In this way, the control unit 12 executes the calibration process for each transmitter pair in a prescribed sequence.

After completing the calibration process, the communication apparatus 1 transmits the RF signal in a designated transmission direction; in this case, the control unit 12 controls the phase adjuster 22 for each pair of two adjacent transmitters so that a phase difference appropriate to the designated transmission direction is provided between the RF signals output from the two transmitters. Further, the control unit 12 controls the amplitude adjuster 23 for each pair of two adjacent transmitters so that the amplitude levels of the RF signals output from the two transmitters become equal to each other.

According to the second embodiment, the communication apparatus can accurately adjust not only the phase difference between the RF signals output from two adjacent transmitters but also the amplitude level difference between them.

According to a modified example of the first or second embodiment, the RF signals to be input to the respective transmitters may be generated by different wave sources, the only requirement being that the RF signals be identical in frequency.

Figure 10:
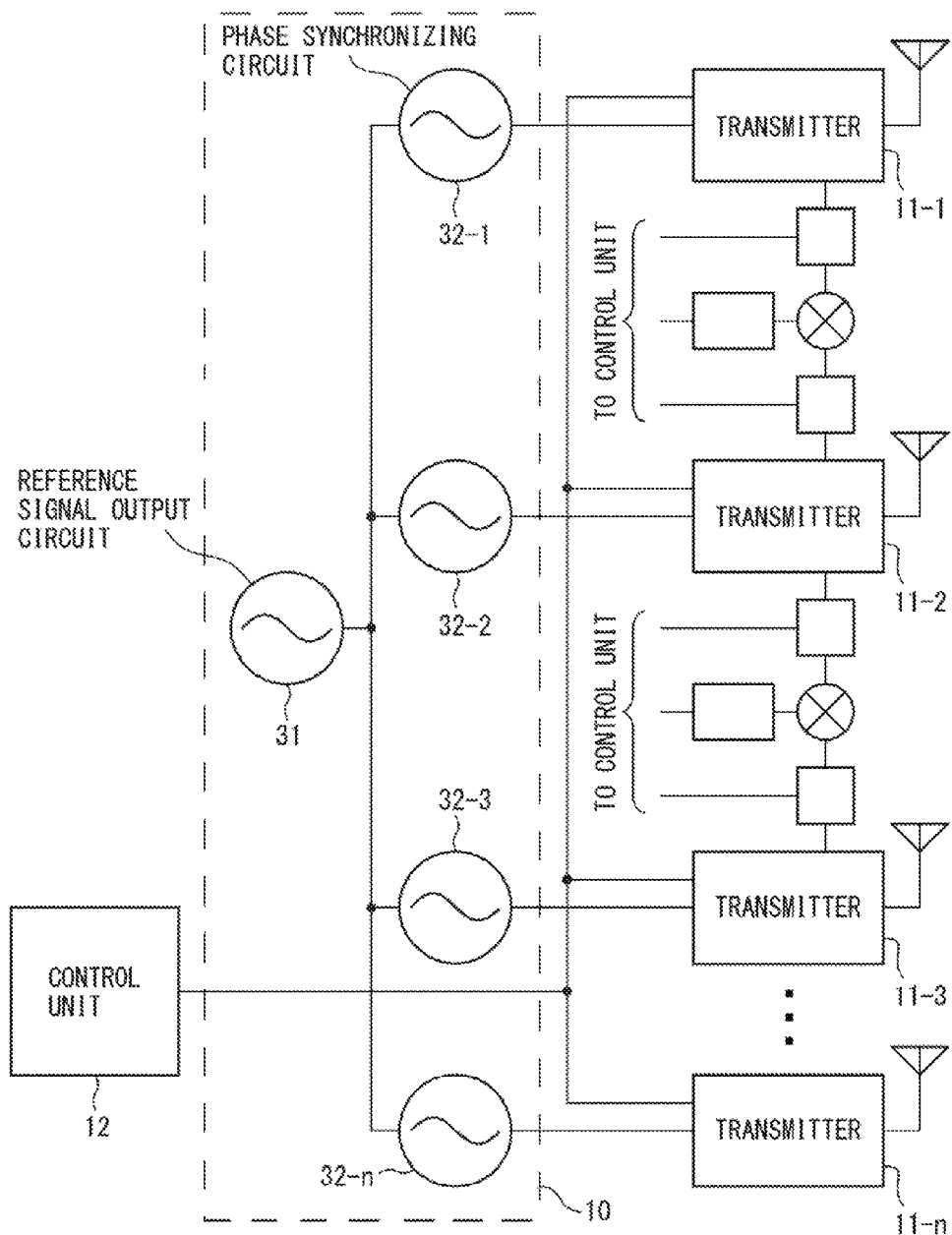
FIG. 10 is a diagram schematically illustrating the configuration of a communication apparatus according to a modified example.

FIG. 10 is a diagram schematically illustrating the configuration of a communication apparatus according to this modified example. In this modified example, the oscillator 10 includes a reference signal output circuit 31 and a plurality of phase synchronizing circuits 32-1 to 32-n, one for each transmitter.

The reference signal output circuit –generates and outputs a reference signal oscillating at a fundamental frequency.

Each of the phase synchronizing circuits 32-1 to 32-n generates an RF signal with a fundamental frequency and synchronized in phase to the reference signal. Each of the phase synchronizing circuits 32-1 to 32-n then supplies the generated RF signal to a corresponding one of the transmitters 11-1 to 11-n. In this case, the RF signals, when input to the respective transmitters 11-1 to 11-n, may be shifted in phase relative to each other. This phase shift is contained in the phase difference ($\alpha$–$\beta$) between the RF signals in the equation (8) or (10). Accordingly, in this modified example, the control unit 12 can adjust the phase (or amplitude level) of the RF signal in each transmitter in the same manner as the above embodiments.

Next, a third embodiment will be described. In the third embodiment, the RF signal generated by the oscillator is directly input as a reference signal to the mixer together with the RF signal output from each transmitter when executing the calibration process.

Figure 11:
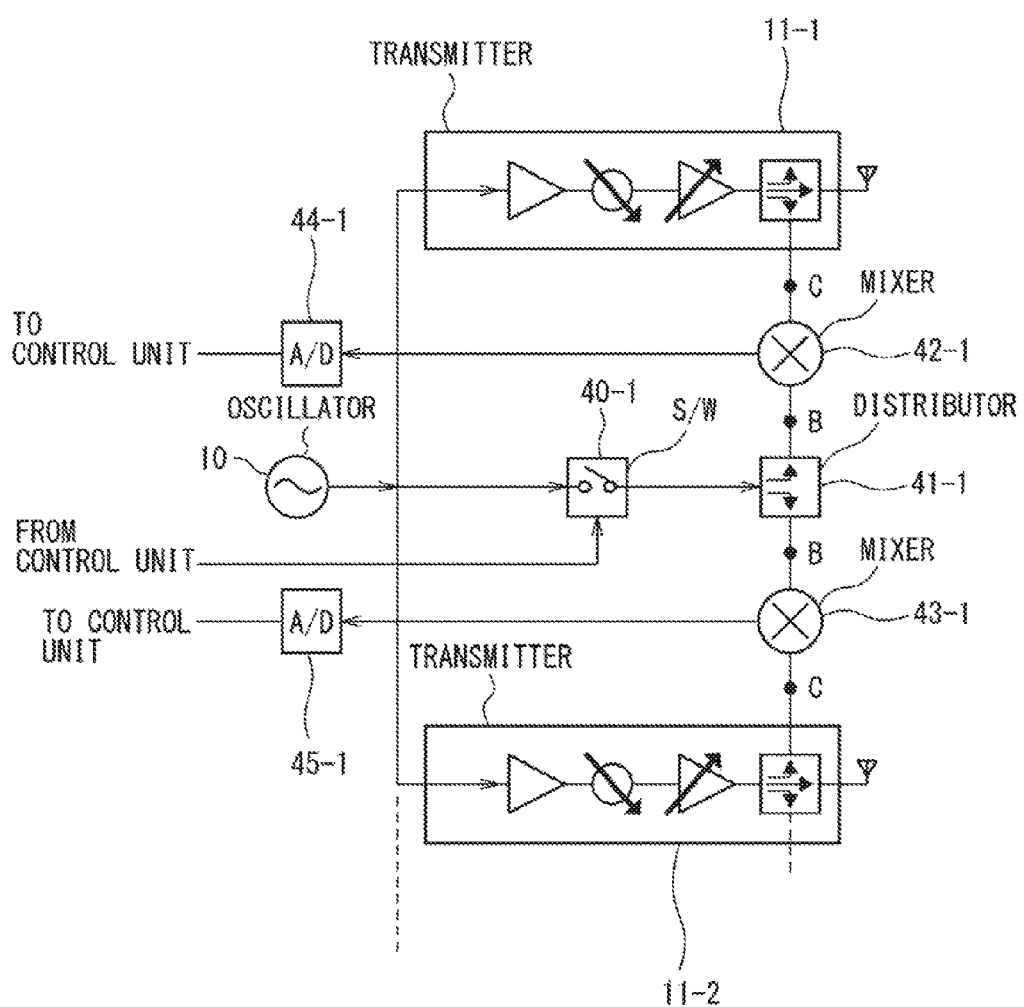
FIG. 11 is a circuit block diagram of a calibration process execution unit according to a third embodiment.

FIG. 11 is a circuit block diagram of a calibration process execution unit according to the third embodiment. In this embodiment, the calibration process is executed for each pair of two adjacent transmitters. In this embodiment, a distributor, a switch, two mixers, and two A/D converters are provided for each pair of two adjacent transmitters. The execution unit illustrated in FIG. 11 includes the transmitters 11-1 and 11-2. In this embodiment, a portion of the RF signal output from the oscillator 10 is input into each of the mixers 42-1 and 43-1 via the switch 40-1 and distributor 41-1. The RF signal output from the transmitter 11-1 is input into the mixer 42-1. On the other hand, the RF signal output from the transmitter 11-2 is input into the mixer 43-1. Accordingly, the mixer 42-1 generates a composite signal by combining the RF signal output from the transmitter 11-1 with the RF signal that has been input via the switch 40-1 and distributor 41-1 without passing through the transmitter. Similarly, the mixer 43-1 generates a composite signal by combining the RF signal output from the transmitter 11-2 with the RF signal that has been input via the switch 40-1 and distributor 41-1 without passing through the transmitter. The composite signal output from the mixer 42-1 is digitized by the A/D converter 44-1 by sampling at a predetermined sampling frequency, and the digitized signal is supplied to the control unit. Similarly, the composite signal output from the mixer 43-1 is digitized by the A/D converter 45-1 by sampling at the predetermined sampling frequency, and the digitized signal is supplied to the control unit. The predetermined sampling frequency is a frequency not lower than twice the switching frequency of the switch 40-1 but lower than the frequency of the RF signal.

It is preferable to arrange the mixer 42-1 so that the difference between the signal line length from the distributor 41-1 to the mixer 42-1 and the signal line length from the transmitter 11-1 to the mixer 42-1 becomes equal to an integral multiple of the wavelength of the RF signal. Similarly, it is preferable to arrange the mixer 43-1 so that the difference between the signal line length from the distributor 41-1 to the mixer 43-1 and the signal line length from the transmitter 12-1 to the mixer 43-1 becomes equal to an integral multiple of the wavelength of the RF signal. Further, it is preferable to arrange the distributor 41-1 so that the difference between the signal line length from the distributor 41-1 to the transmitter 11-1 and the signal line length from the distributor 41-1 to the transmitter 12-1 becomes equal to an integral multiple of the wavelength of the RF signal. With this arrangement, when executing the calibration process, the control unit need not take into account the phase difference that would arise between the RF signals due to the difference between the signal lines from the distributor to the two transmitters.

During the execution of the calibration process, the control unit turns the switch 40-1 on and off at the switching frequency which is lower than the frequency of the RF signal. Accordingly, the composite signal output from the mixer 42-1 is expressed by the following equation.

$$Z_{xy} = XY = (xs_c) \cdot (y) \qquad (13)$$
$$= AB \cdot \cos(\omega t + \alpha) \cdot \cos(\omega t + \beta) \cdot s_c$$
$$= \frac{AB}{2} \cdot \{\cos(2\omega t + \alpha + \beta) + \cos(\alpha - \beta)\} \cdot \left(r + \frac{1}{2}\right)$$

where X is the reference signal, i.e., the RF signal which is input into the mixer 42-1 without passing through the transmitter. Y is the RF signal output from the transmitter 11-1. $S_c$ is the switching signal which is superimposed on the reference signal X by turning on and off the switch 40-1, and is expressed by the earlier given equation (2).

Since the frequency ω representing the frequency of the RF signal (i.e., the frequency of the RF signal carrier) is higher than the sampling frequency of the A/D converter 44-1, the first term in the equation (13) is cut off when digitizing the composite signal. The second term in the equation (13), as in the earlier given equation (8), contains the switching frequency component whose coefficient is the cosine of the phase difference (α−β) between the two RF signals input into the mixer 42-1. Accordingly, when the phase difference (α−β) between the RF signal output from the transmitter 11-1 and the reference signal is +90° or −90°, the amplitude level of the switching frequency component becomes 0. Therefore, as in the first embodiment, the control unit examines the amplitude level or the power of the switching frequency component while varying the phase difference (α−β) between the RF signal output from the transmitter 11-1 and the reference signal by controlling the phase adjuster 22 in the transmitter 11-1. Then, the control unit determines that the phase adjustment amount that minimizes the amplitude level or the power of the switching frequency component is the phase adjustment amount corresponding to the phase difference +90° or −90°.

The control unit executes the same calibration process for the composite signal output from the mixer 43-1. Then, based on the switching frequency component contained in the composite signal, the control unit can control the phase adjustment amount between the RF signal output from the transmitter 11-2 and the reference signal. For example, the control unit can determine that the phase adjustment amount that minimizes the amplitude level or the power of the switching frequency component contained in the RF signal is the phase adjustment amount when the phase difference between the RF signal output from the transmitter 11-2 and the reference signal becomes +90° or −90°.

In the present embodiment, the RF signal output from the transmitter 11-1 and the RF signal output from the transmitter 11-2 are both adjusted in phase so that the phase difference with respect to the reference signal becomes +90° or −90°. Therefore, by adjusting the RF signal output from the transmitter 11-1 and the RF signal output from the transmitter 11-2 so that both have a phase difference of 90° with respect to the reference signal, the control unit can provide a phase difference of 0° between the two RF signals. On the other hand, by adjusting the RF signal output from the transmitter 11-1 and the RF signal output from the transmitter 11-2 so that one has a phase difference of 90° and the other has a phase difference of −90° with respect to the reference signal, the control unit can provide a phase difference of 180° between the two RF signals.

In the third embodiment, as in the second embodiment, a mixer of the type that can output a signal containing a square-law detection component of input signals may be used as the mixer. Further, in the third embodiment, the control unit may obtain as the reference phase adjustment amount the phase adjustment amount corresponding to the phase difference (α−β) that occurs when the amplitude level of the switching frequency component is at some other value, for example, at a maximum value.

In the third embodiment, instead of the switch 40-1, switches may be provided at points B and C in FIG. 11, and the control unit may perform control to synchronize the switches at B and C in phase. This means that the RF signal modulated at the switching frequency and the reference signal modulated at the switching frequency are input into each mixer. In this case, the control unit obtains the phase adjustment amount for the RF signal in each transmitter so as to minimize the switching frequency component contained in the composite signal output from each mixer, as in the first embodiment. In this way, the control unit can identify the phase adjustment amount with which the phase difference between the RF signal and the reference signal becomes +90° or −90°. Furthermore, in the third embodiment, the amplitude adjuster in each transmitter may be omitted.

Next, a communication apparatus according to a fourth embodiment will be described. The communication apparatus according to the fourth embodiment includes a plurality of receivers in order to provide directionality to signal receive characteristics. According to this communication apparatus, when executing the calibration process, a locally oscillated signal is input to each receiver after modulating it at a switching frequency, and a composite signal is produced by combining together the locally oscillated signal not modulated and the locally oscillated signal modulated at the switching frequency and passed through the receiver. Then, the communication apparatus extracts the switching frequency component contained in the composite signal, and controls the phase adjustment amount based on the switching frequency component.

Figure 12:
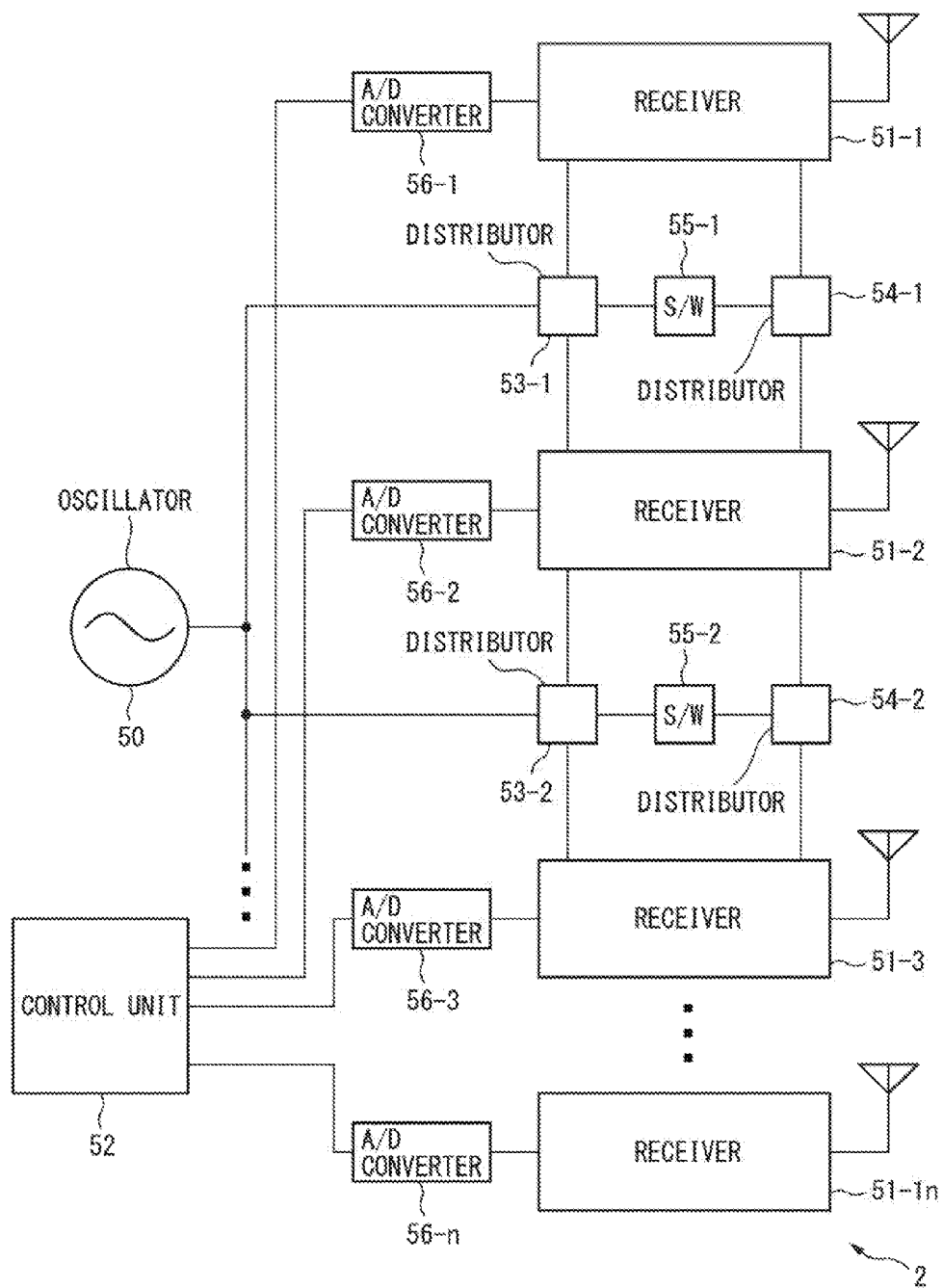
FIG. 12 is a diagram schematically illustrating the configuration of a communication apparatus according to a fourth embodiment.

FIG. 12 is a diagram schematically illustrating the configuration of the communication apparatus according to the fourth embodiment. The communication apparatus 2 includes an oscillator 50, a plurality of receivers 51-1 to 51-*n* (n is an integer not smaller than 2), and a control unit 52. The communication apparatus 2 further includes distributors 53-1 to 53-(n−1) and 54-1 to 54-(n−1) and switches 55-1 to 55-(n−1), each provided between any two adjacent receivers, and A/D converters 56-1 to 56-*n*.

Figure 13:
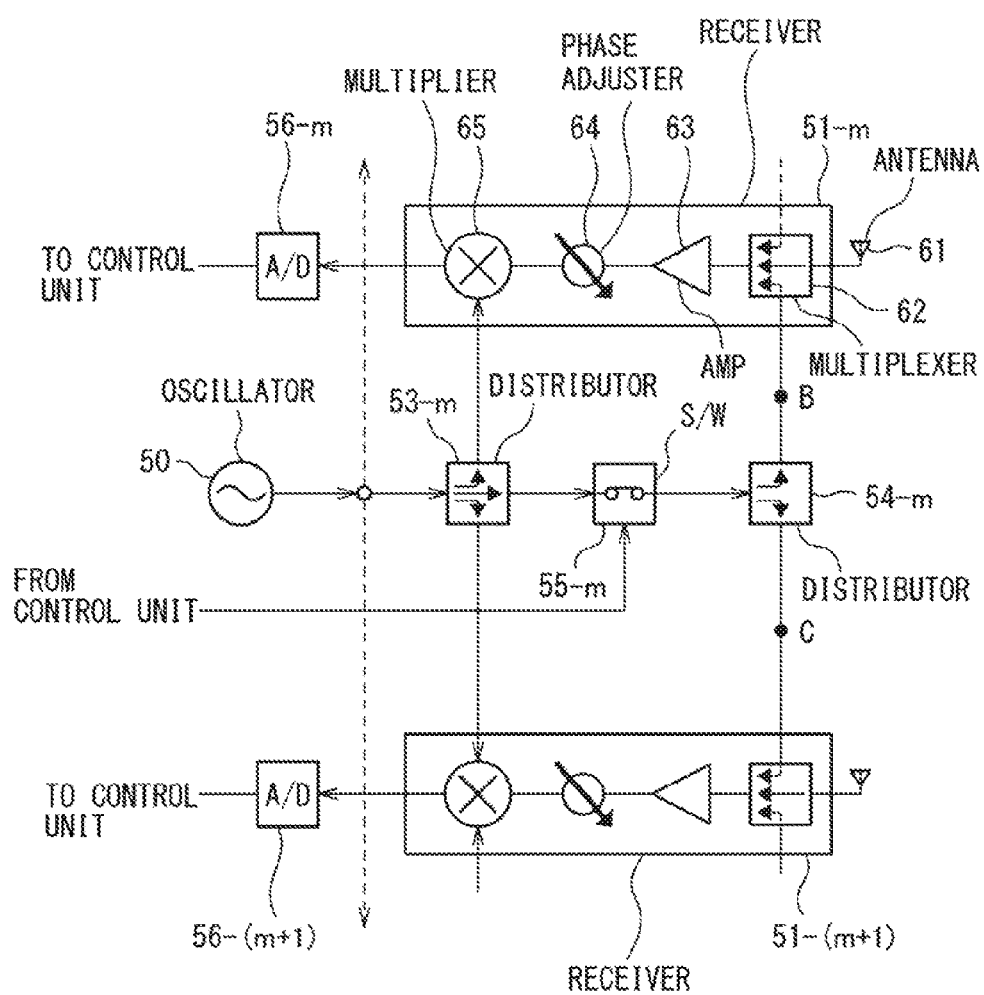
FIG. 13 is a circuit block diagram of a calibration process execution unit according to the fourth embodiment.

FIG. 13 is a circuit block diagram of a calibration process execution unit according to the fourth embodiment. The calibration process execution unit includes two adjacent receivers, two distributors used to input the locally oscillated signal from the oscillator 50 to the two receivers, and a switch for modulating the locally oscillated signal. The execution unit illustrated in FIG. 13 includes the receivers 51-1 and 51-2.

The oscillator 50 outputs the locally oscillated signal which is used to downconvert the radio-frequency signal received by each receiver to a baseband frequency.

Each of the receivers 51-1 to 51-*n* is an example of a communication device and include an antenna 61, a multiplexer 62, an amplifier 63, a phase adjuster 64, and a multiplier 65. Each receiver receives a radio wave by the antenna 61 as an RF signal. It is preferable to arrange the receivers 51-1 to 51-*n* so that the antennas 61 provided on the respective receivers are equally spaced between any two adjacent receivers. Then, the receivers 51-1 to 51-*n* provide directionality to the receive characteristics by providing a phase difference appropriate to a designated receive direction between the RF signals received by the two adjacent receivers in accordance with a control signal supplied from the control unit 52. Then, each of the receivers 51-1 to 51-*n* converts the received RF signal to a baseband signal by using the locally oscillated signal from the oscillator 50, and supplies the baseband signal to the control unit 52 via a corresponding one of the A/D converters 56-1 to 56-*n*.

The control unit 52 includes, for example, a processor and a nonvolatile memory circuit and, in order to provide directionality to the receive characteristics, controls the phase of the RF signal passing through each receiver. For this purpose, the control unit 52 controls the phase adjuster contained in each receiver.

The distributor 53-*m* (m=1, 2, . . . , n−1) supplies a portion of the locally oscillated signal received from the oscillator 50 to each of the multipliers 65 contained in the respective receivers 51-*m* and 51-(m+1). The locally oscillated signal supplied from the distributor 53-*m* directly to the multipliers 65 in the respective receivers 51-*m* and 51-(m+1) serves as the reference signal during the execution of the calibration process. The distributor 53-*m* supplies the other portion of the locally oscillated signal to the distributor 54-*m* via the switch 55-*m*.

The distributor 54-*m* (m=1, 2, . . . , n−1), which received the other portion of the locally oscillated signal from the distributor 54-*m* via the switch 55-*m*, distributes that portion to the multiplexers 62 in the respective receivers 51-*m* and 51-(m+1).

It is preferable to arrange the distributor 53-*m* so that the difference between the signal line length from the distributor 53-*m* to the multiplier 65 in the receiver 51-*m* and the signal line length from the distributor 53-*m* to the multiplier 65 in the receiver 51-(m+1) becomes equal to an integral multiple of the wavelength of the locally oscillated signal. Similarly, it is preferable to arrange the distributor 54-*m* so that the difference between the signal line length from the distributor 54-*m* to the multiplexer 62 in the receiver 51-*m* and the signal line length from the distributor 54-*m* to the multiplexer 62 in the receiver 51-(m+1) becomes equal to an integral multiple of the wavelength of the locally oscillated signal. With this arrangement, when executing the calibration process, the control unit 52 need not take into account the phase difference of the locally oscillated signal that would arise due to the difference between the signal lines from the distributors to the two receiver.

The switch 55-*m* (m=1, 2, . . . , n−1) is used to modulate the locally oscillated signal when executing the calibration process. During the execution of the calibration process, the switch 55-*m* is turned on and off at the switching frequency in accordance with a control signal from the control unit 52 in the same manner as in each of the above embodiments or modified examples. It is preferable to set the switching frequency lower than the local oscillation frequency. On the other hand, when the communication apparatus 2 is performing a signal receive operation, the switch 55-*m* is held off.

The component elements constituting the receivers 51-1 to 51-*n* will be described below.

When the communication apparatus 2 is performing a signal receive operation, the multiplexer 62 in the receiver 53-*m* (m=1, 2, . . . , n) passes the RF signal received via the antenna 61 to the amplifier 63. On the other hand, during the execution of the calibration process, the multiplexer 62 passes the locally oscillated signal received via the distributor 54-(m−1) or 54-*m* to the amplifier 63.

The amplifier 63 amplifies the signal received from the multiplexer 62 and supplies it to the phase adjuster 64. The phase adjuster 64 adjusts the phase of the input signal in accordance with a control signal from the control unit 52 in the same manner as the phase adjuster 22 provided in the transmitter according to the first embodiment. The phase adjuster 64 supplies the phase-adjusted signal to the multiplier 65.

The multiplier 65 is one example of a signal combiner, and produces the composite signal by multiplying the phase-adjusted signal output from the phase adjuster 64 with the locally oscillated signal received from the distributor 53-(m−1) or 53-*m*. When the communication apparatus 2 is performing a signal receive operation, the signal that the multiplier 65 receives from the phase adjuster 64 is the received RF signal; therefore, the composite signal output from the multiplier 65 contains the baseband signal with the baseband frequency. The composite signal containing the baseband signal is supplied via the A/D converter 56-1 to the control unit 52. The control unit 52 extracts from the baseband signal the information contained in the received RF signal.

On the other hand, during the execution of the calibration process, since the signal that the multiplier 65 receives from the phase adjuster 64 is also the locally oscillated signal, the composite signal is the locally oscillated signal modulated at the switching frequency by the switch 55-*m*, as will be described later. Accordingly, the multiplier 65 outputs as the composite signal the signal produced by multiplying the reference signal, i.e., the locally oscillated signal not modulated, with the locally oscillated signal modulated at the switching frequency. The composite signal in this case is expressed by the earlier given equation (13). However, in this case, ω is the local oscillation frequency.

Therefore, as in the third embodiment, the control unit 52 examines the amplitude level or the power of the switching frequency component contained in the composite signal while varying the phase adjustment amount to be applied by the phase adjuster 64 contained in the receiver 54-*m*. Then, the control unit 52 can determine that the phase adjustment amount that minimizes the amplitude level or the power of the switching frequency component is the phase adjustment amount with which the phase difference between the reference signal and the locally oscillated signal passed through the receiver 51-*m* becomes +90° or −90°. By performing the same processing on the other receiver, the control unit 52 can identify the phase adjustment amount with which the phase difference between the reference signal and the locally oscillated signal passed through the receiver becomes +90° or −90°.

For each receiver, the control unit 52 stores the phase adjustment amount with which the phase difference between the reference signal and the locally oscillated signal passed through the receiver becomes +90° or −90° as the reference phase adjustment amount that serves as the reference for the phase adjustment. Then, when the communication apparatus 2 performs a signal receive operation, the control unit 52, based on the reference phase adjustment amount, determines for each pair of two adjacent receivers the phase adjustment amount corresponding to the phase difference to be provided between the RF signals received by the two receivers in accordance with the signal receive direction. Therefore, by adjusting the phases of the locally oscillated signals respectively passing through the two adjacent receivers so that both have a phase difference of 90° with respect to the reference signal, as in the third embodiment, the control unit 52 can provide a phase difference of 0° between the locally oscillated signals respectively passing through the two adjacent receivers. On the other hand, by adjusting the phases of the locally oscillated signals respectively passing through the two adjacent receivers so that one has a phase difference of 90° and the other has a phase difference of −90° with respect to the reference signal, the control unit 52 can provide a phase difference of 180° between the locally oscillated signals respectively passing through the two adjacent receivers. In the present embodiment, the control unit 52 may obtain as the reference phase adjustment amount the phase adjustment amount corresponding to the phase difference ($\alpha-\beta$) that occurs when the amplitude level of the switching frequency component is at some other value, for example, at a maximum value.

According to the present embodiment, the communication apparatus can accurately adjust the phase difference between the signals received by the two receivers, even if the multiplier in each receiver is imperfect.

According to a modified example of the fourth embodiment, switches may be provided, one between the distributor 54-*m* and the receiver 51-*m* and the other between the distributor 54-*m* and the receiver 51-(m+1), as indicated by points B and C in FIG. 13. Then, the switch provided between the distributors 53-*m* and 54-*m* (m=1, 2, . . . , n−1) may be omitted. In this case, the control unit 52 can control the on/off operation of the switch provided between the distributor 54-*m* and the receiver 51-*m* and the on/off operation of the switch provided between the distributor 54-*m* and the receiver 51-(m+1) independently of each other. As a result, the control unit 12 can perform the calibration of the receiver 51-*m* and the calibration of the receiver 51-(m+1) independently of each other.

According to a modified example of each of the above embodiments, any circuit device within the transmitter or receiver that can be switched on and off may be used as the switching device for modulating the RF signal or locally oscillated signal at the switching frequency when executing the calibration process. For example, the amplifier contained in the transmitter or receiver may be used as the switching device. In this case, the control unit switches the amplifier on and off during the execution of the calibration process. Since this serves to reduce the number of devices used when executing the calibration process, the circuit configuration can be simplified.

According to another modified example of each of the above embodiments, the communication apparatus may be configured as a communication apparatus that outputs a signal on a signal line, not on a wireless line. In this case, each transmitter or receiver in the communication apparatus includes, instead of the antenna, an interface for connecting to the signal line. The communication apparatus according to this modified example is used to enhance the speed of signal input and output or to communicate a plurality of signals in parallel, for example, in differential transmission or the like. In this case, in order to phase-synchronize the signals output from the respective transmitters or to reverse the phase difference between the signals transmitted on adjacent signal lines, the communication apparatus adjusts the phase difference of the RF signals between the adjacent transmitters in the same manner as in any one of the above embodiments or their modified examples. Further, in this modified example, the RF signal input to each transmitter may be a burst signal with a switching frequency. In other words, since the RF signal is already modulated at the switching frequency before it is input to the transmitter, the control unit can execute the calibration process in the same manner as in any of the above embodiments but without having to modulate the RF signal by using a switching device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:
1. A communication apparatus comprising:
 a plurality of communication devices each of which transmits or receives a signal and each of which includes a phase adjuster for adjusting the phase of the signal;
 an oscillator which supplies a first signal with a first frequency;
 a switching device which modulates at least one of the first signal passed through a first communication device among the plurality of communication devices and a second signal with the first frequency but not passed through the first communication device at a second frequency lower than the first frequency;
 a signal combiner which combines together the first signal passed through the first communication device and the second signal, at least one of which is modulated, to generate a composite signal containing a switching frequency component with an amplitude in response to a phase difference taken between the first signal and the second signal at the second frequency; and a controller which, based on the switching frequency component contained in the composite signal, obtains as a reference phase adjustment amount a phase adjustment amount applied by the phase adjuster in the first communication device when the phase difference between the first signal and the second signal is at a prescribed value, and which, based on the reference phase adjustment amount, controls the phase adjuster in the first communication device so that a predetermined phase difference is provided between the signal that the first communication device transmits or receives and the signal that a second communication device adjacent to the first communication device among the plurality of communication devices transmits or receives.

2. The communication apparatus according to claim 1, wherein the second signal is a signal that is output from the oscillator and passed through the second communication device, and wherein the signal combiner is disposed at a position at which a difference between a signal line length from the first communication device to the signal combiner and a signal line length from the second communication device to the signal combiner is equal to an integral multiple of the wavelength of the first signal, the switching device includes a first switch disposed between the first communication device and the signal combiner and a second switch disposed between the second communication device and the signal combiner, and the controller modulates the first signal output from the first communication device for input to the signal combiner at the second frequency by the first switch and modulates the second signal output from the second communication device for input to the signal combiner at the second frequency by the second switch in phase with the modulation being performed by the first switch, to cause the signal combiner to generate the composite signal containing the switching frequency component.

3. The communication apparatus according to claim 2, wherein the first communication device further includes an amplitude adjuster for adjusting an amplitude level of the first signal passing through the first communication device, and wherein the signal combiner further outputs at the second frequency a second composite signal containing a second switching frequency component with an amplitude in response to a difference taken between the amplitude of the first signal and the amplitude of the second signal, and the controller controls the amplitude adjuster, based on the second switching frequency component contained in the second composite signal.

4. The communication apparatus according to claim 3, wherein the signal combiner outputs the second composite signal when the modulation that the first switch performs on the first signal and the modulation that the second switch performs on the second signal are reversed in phase relative to each other, and wherein the controller obtains the reference phase adjustment amount from the composite signal obtained by controlling the first and second switches so that the modulation that the first switch performs on the first signal and the modulation that the second switch performs on the second signal are in phase with each other, and the controller controls the amplitude adjuster, based on the second composite signal obtained by controlling the first and second switches so that the modulation that the second switch performs on the second signal is reversed in phase with respect to the modulation that the first switch performs on the first signal.

5. The communication apparatus according to claim 1, further comprising:

a distributor which distributes the first signal output from the oscillator as two portions of the second signal; and a second signal combiner which is disposed between the second communication device and the distributor, and which multiplies the modulated second signal with the first signal passed through the second communication device to output a second composite signal containing a second switching frequency component with an amplitude in response to a phase difference taken between the first signal passed through the second communication device and the second signal at the second frequency, and wherein:

the signal combiner is disposed between the distributor and the first communication device, the switching device is disposed on a path through which the second signal passes before the second signal is input to the signal combiner and the second signal combiner and modulates the second signal at the second frequency, and the controller obtains the phase adjustment amount for the first communication device based on the switching frequency component contained in the composite signal and, based on the second switching frequency component contained in the second composite signal, obtains as the reference phase adjustment amount for the second communication device the phase adjustment amount applied by the phase adjuster in the second communication device.

6. The communication apparatus according to claim 5, wherein the distributor is disposed at a position at which a difference between a signal line length from the first communication device to the distributor and a signal line length from the second communication device to the distributor is equal to an integral multiple of the wavelength of the first signal, the signal combiner is disposed at a position at which a difference between a signal line length from the first communication device to the signal combiner and a signal line length from the distributor to the signal combiner is equal to an integral multiple of the wavelength of the first signal, and the second signal combiner is disposed at a position at which a difference between a signal line length from the second communication device to the second signal combiner and a signal line length from the distributor to the second signal combiner is equal to an integral multiple of the wavelength of the first signal.

7. The communication apparatus according to claim 1, wherein each of the plurality of communication devices is a transmitter for transmitting a signal.

8. The communication apparatus according to claim 1, wherein each of the plurality of communication devices is a receiver for receiving a radio wave, and wherein the first communication device includes the signal combiner, an antenna which receives the radio wave to output a signal in response to the received radio wave and a multiplexer which is disposed between the antenna and the phase adjuster and which takes as input the first signal or the signal output from the antenna, the communication apparatus further comprising:
- a first distributor which distributes a portion of the first signal output from the oscillator as the second signal to the signal combiner in the first communication device; and
- a second distributor which distributes the other portion of the first signal output from the first distributor to the multiplexer in the first communication device, and wherein:
- the switching device is disposed between the first distributor and the second distributor or between the second distributor and the first communication device, and modulates the other portion of the first signal output at the second frequency.

9. The communication apparatus according to claim 1, wherein the controller takes as the reference phase adjustment amount the phase adjustment amount applied by the phase adjuster when the switching frequency component contained in the composite signal is at a minimum.

10. A phase adjustment method for use in a communication apparatus comprising a plurality of communication devices each of which transmits or receives a signal and each of which includes a phase adjuster for adjusting the phase of the signal, and an oscillator which supplies a first signal with a first frequency, the method comprising:
- by a switching device, modulating at least one of the first signal passed through a first communication device among the plurality of communication devices and a second signal with the first frequency but not passed through the first communication device at a second frequency lower than the first frequency;
- by a signal combiner, combining together the first signal passed through the first communication device and the second signal, at least one of which is modulated, to generate a composite signal containing a switching frequency component with an amplitude in response to a phase difference taken between the first signal and the second signal at the second frequency;
- based on the switching frequency component contained in the composite signal, obtaining as a reference phase adjustment amount a phase adjustment amount applied by the phase adjuster in the first communication device when the phase difference between the first signal and the second signal is at a prescribed value; and
- based on the reference phase adjustment amount, controlling the phase adjuster in the first communication device so that a predetermined phase difference is provided between the signal that the first communication device transmits or receives and the signal that a second communication device adjacent to the first communication device among the plurality of communication devices transmits or receives.

11. The phase adjustment method according to claim 10, wherein the second signal is a signal that is output from the oscillator and passed through the second communication device, and wherein
- the signal combiner is disposed at a position at which a difference between a signal line length from the first communication device to the signal combiner and a signal line length from the second communication device to the signal combiner is equal to an integral multiple of the wavelength of the first signal,
- the switching device includes a first switch disposed between the first communication device and the signal combiner and a second switch disposed between the second communication device and the signal combiner, and
- the modulating at least one of the first signal and the second signal including:
  - modulating the first signal output from the first communication device for input to the signal combiner at the second frequency by the first switch; and
  - modulating the second signal output from the second communication device for input to the signal combiner at the second frequency by the second switch in phase with the modulation being performed by the first switch.

12. The phase adjustment method according to claim 10, further comprising:
- by a distributor, distributing the first signal output from the oscillator as two portions of the second signal; and
- by a second signal combiner which is disposed between the second communication device and the distributor, multiplying the modulated second signal with the first signal passed through the second communication device to output a second composite signal containing a second switching frequency component with an amplitude in response to a phase difference taken between the first signal passed through the second communication device and the second signal at the second frequency, wherein:
- the signal combiner is disposed between the distributor and the first communication device,
- the switching device is disposed on a path through which the second signal passes before the second signal is input to the signal combiner and the second signal combiner,
- the modulating at least one of the first signal and the second signal modulates the second signal at the second frequency, and
- the obtaining the reference phase adjustment amount obtains the phase adjustment amount for the first communication device based on the switching frequency component contained in the composite signal and, based on the second switching frequency component contained in the second composite signal, obtains as the reference phase adjustment amount for the second communication device the phase adjustment amount applied by the phase adjuster in the second communication device.

13. The phase adjustment method according to claim 10, wherein each of the plurality of communication devices is a receiver for receiving a radio wave, and wherein the first communication device includes the signal combiner, an antenna which receives the radio wave to output a signal in response to the received radio wave and a multiplexer which is disposed between the antenna and the phase adjuster and which takes as input the first signal or the signal output from the antenna, the method further comprising:
- by a first distributor, distributing a portion of the first signal output from the oscillator as the second signal to the signal combiner in the first communication device; and
- by a second distributor, distributing the other portion of the first signal output from the first distributor to the multiplexer in the first communication device, and wherein:
- the modulating at least one of the first signal and the second signal modulates the other portion of the first signal output at the second frequency by the switching device which is disposed between the first distributor and the second distributor or between the second distributor and the first communication device.

14. The phase adjustment method according to claim 10, wherein the obtaining the reference phase adjustment amount takes as the reference phase adjustment amount the phase adjustment amount applied by the phase adjuster when the switching frequency component contained in the composite signal is at a minimum.

15. A communication apparatus comprising:
a plurality of transmitters each of which transmits a signal and each of which includes a phase adjuster for adjusting the phase of the signal;
an oscillator which supplies to each of the plurality of transmitters a first signal obtained by modulating a signal with a first frequency at a second frequency lower than the first frequency;
a signal combiner which is disposed at a position at which a difference between a signal line length from a first communication device among the plurality of communication devices and a signal line length from a second communication device adjacent to the first communication device among the plurality of communication devices is equal to an integral multiple of a wavelength corresponding to the first frequency, and which combines together the first signal output from the first communication device and the first signal output from the second communication device to generate a composite signal containing a switching frequency component with an amplitude in response to a phase difference taken between the first signal output from the first communication device and the first signal output from the second communication device at the second frequency; and
a controller which, based on the switching frequency component contained in the composite signal, obtains as a reference phase adjustment amount a phase adjustment amount applied by the phase adjuster in the first communication device when the phase difference between the first signal output from the first communication device and the first signal output from the second communication device is at a prescribed value, and which, based on the reference phase adjustment amount, controls the phase adjuster in the first communication device so that a predetermined phase difference is provided between the first signal that the first communication device outputs and the first signal that the second communication outputs.

* * * * *